United States Patent
Jonnalagadda et al.

(10) Patent No.: US 11,563,635 B2
(45) Date of Patent: *Jan. 24, 2023

(54) MODEL-DRIVEN SERVICE ROLLBACK MECHANISM FOR DATA INTEGRITY

(71) Applicant: Microsoft Technology Licensing, LLC, Redmond, WA (US)

(72) Inventors: Prasad Jonnalagadda, Acton, MA (US); Livin Wilson Valiyaveetil, Framingham, MA (US); Venu Goli, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,443

(22) Filed: Nov. 29, 2021

(65) Prior Publication Data

US 2022/0166674 A1   May 26, 2022

Related U.S. Application Data

(63) Continuation of application No. 16/784,457, filed on Feb. 7, 2020, now Pat. No. 11,190,402.

(Continued)

(51) Int. Cl.
*H04L 41/0859* (2022.01)
*H04L 41/0604* (2022.01)
(Continued)

(52) U.S. Cl.
CPC ...... *H04L 41/0863* (2013.01); *H04L 41/0627* (2013.01); *H04L 41/0816* (2013.01); *H04L 41/0843* (2013.01); *H04L 41/0856* (2013.01)

(58) Field of Classification Search
CPC .............. H04L 41/863; H04L 41/0627; H04L 41/0816; H04L 41/0843; H04L 41/0856
See application file for complete search history.

(56) References Cited

U.S. PATENT DOCUMENTS 10,452,497 B2 *  10/2019  Straub ................. G06F 16/958
2011/0307263 A1 *  12/2011  Bader ................... G06Q 30/06
705/1.1

(Continued)

OTHER PUBLICATIONS

Demchenko et al., "Enabling Automated Network Services Provisioining for Cloud Based Applications Using Zero Touch Provisioning", 2015 IEEE/ACM 8th Intenrational Conference on Uitlityand Cloud Computing, Dec. 7, 2015.*

(Continued)

*Primary Examiner* — Todd L Barker

(74) *Attorney, Agent, or Firm* — Ray Quinney & Nebeker P.C; James Bullough

(57) ABSTRACT

Systems and methods for rollback of model-based provisioned network device configuration including a memory capable of storing a model-based provisioned data template that includes a data template sequence. Data associated with a request to transmit a target object request message are received and transmitted following a retrieval message that determines pre-configuration data of the target device. The pre-configuration data is stored and the target object request message is sent specifying CRUD semantics. A notification is received indicating an outcome of the execution and, if the execution outcome is unsuccessful, a rollback stack is retrieved that specifies CRUD semantics and the pre-configuration parameters are retrieved to restore the target device to a pre-request state. If the execution outcome is successful, a second target object request message is retrieved from a list of target devices.

19 Claims, 20 Drawing Sheets

Related U.S. Application Data

(60) Provisional application No. 62/704,057, filed on Feb. 8, 2019.

(51) Int. Cl.
*H04L 41/0816* (2022.01)
*H04L 41/084* (2022.01)
*H04L 41/0853* (2022.01)

(56) References Cited

U.S. PATENT DOCUMENTS

2018/0131745 A1\* 5/2018 Shakir ................... H04L 65/65
2021/0352021 A1\* 11/2021 Parker ................... H04L 47/70

OTHER PUBLICATIONS

Sung et al. "Robotron:Top-down Network Management at Facebook Scale", 2016 Proceedings of the 2016 ACM Sigcomm Conference, Aug. 2016, pp. 426-439.\*

Basin et al., "A Modell-Driven Methodology for Developing Secure Data-Management Applications", IEEE Transactions on Software Engineering, Apr. 2014, IEEE Publishing.\*

\* cited by examiner

MODEL-DRIVEN SERVICE ROLLBACK MECHANISM FOR DATA INTEGRITY

This application is a continuation of U.S. patent application Ser. No. 16/784,457 (the '457 application) filed Feb. 7, 2020. The '457 application claims priority to U.S. Provisional Patent Application No. 62/704,057, filed Feb. 8, 2019. Each of the aforementioned is hereby incorporated by reference in its entirety.

TECHNICAL FIELD

The present disclosure relates to distributed network data integrity for service data. More specifically, the present disclosure relates to systems and methods of providing automated data integrity for a service using model-driven provisioning of telecommunication applications.

BACKGROUND

Data integrity requires that stored data be reliable and accurate over the lifecycle of the service in the system in which it resides. In order to implement, utilize, and change data, network providers must maintain active systems that moderate the integrity of data both before and after functions are executed within the storage system.

Telco applications also tend to be long-lived and frequently reconfigured. For example, in a network that supports consumer mobility customers, a number of network nodes and back-end business systems require configuration each time an additional consumer joins the network or changes their account. A single network service transaction may involve multiple types of operations within a target device and across the target devices in one transaction. For example, in a telco network system, a user's updated information, such as subscriber identity module (SIM) Swap, requires multiple Delete, Read, Create, and Update operations within a single target device such as home subscriber server (HSS) and across target devices such as HSS, policy and charging rules function (PCRF) and telecom application server (TAS) within the network such that each node is appropriately updated to reflect the transaction.

Presently, data integrity in the case of a service anomaly is achieved by individually inspecting each network node to determine whether the data stored therein is accurate as compared to the data status prior to the anomalous service state of the data. Current manual data integrity confirmation procedures require that individual operators or hardware providers keep a pre-service record of data stored on the individual network devices within their control. When a service is requested, the automated model-driven service is applied to the network systematically across all network devices (i.e. a rollout). A rollout may consist of the operations create, retrieve, update, and delete (also referred to herein as CRUD semantics) lifecycles for instantiation upon each network devices. If for any network device the service fails, the service is ceased, and each network device must be inspected by its respective operator to confirm data integrity with the pre-service state. Only after full inspection of each network node, working backward from the triggering anomaly in the rollout, can a distributed network provider confirm data integrity. This process is time consuming and inefficient given that telco applications benefit from agent-less approaches to network management.

Traditionally, the ultimate integration point for these frequent update options in a telco environment is the Operation Support System/Business Support System (OSS/BSS) system. However, integrating changes to devices and/or services in the network tends to be very time consuming and very expensive, requiring custom code development in the OSS/BSS system—itself a very large, complex, and customized system. Additionally, when an implemented change or service fails, manual inspection is required to carry out any process resembling a data integrity confirmation process because the network devices are unable to communicate a pre-service state to a central location. The end result, even after expenditure of sufficient time and money, is that the procedure is not highly automated, instead leading a user through a sequential set of graphical user interface (GUI) screens, often one per type of device that requires configuration to support the overall service and ensure data integrity of the distributed system to its pre-service state.

SUMMARY

Systems and methods are disclosed herein for rollback of model-based provisioned network device configuration. In some embodiments, the system and methods include a memory capable of storing a model-based provisioned data template that includes a data template sequence and a processor in communication with the memory, configured to read the model-based provisioned data template stored in the memory and cause the processor to receive data associated with a request to transmit a target object request message to a target device selected from a list of target device types, the target object request message defining capabilities of the target device, and the capabilities being from a data repository associated with the target device. In some embodiments, the processor is further configured to transmit a retrieval message to the target device; receive a target object response message from the target device in response to the retrieval message, the target object response message including pre-configuration data of the target device; and store the pre-configuration data of the target object response message in a cache associated with the model-based provisioned data template. In some embodiments, the processor is further configured to transmit the target object request message to the target device, the target object request message including configuration parameters specifying create, read, update and delete (CRUD) semantics based on a first object parameter associated with the target device type, a target device type protocol, and user-provided data. In some embodiments, the processor is further configured to receive a notification from the target device indicating an outcome of execution of the target object request message and, if the execution outcome of the target object request message is an unsuccessful execution of the target object request message, retrieve a rollback stack associated with the target object request message, the rollback stack specifying CRUD semantics associated with the configuration parameters; retrieve the pre-configuration data of the target object response message from the cache; and request the target device execute the rollback stack based on the pre-configuration data to restore the target device to a pre-request state. In some embodiments, if the execution outcome of the target object request message is a successful execution of the target object request message, the processor is configured to retrieve a second target object request message from the list of target devices.

In some embodiments, the systems and methods are further configured such that the processor can request that the target device execute the rollback stack includes executing the rollback stack in a reverse order of a rollout stack as an inverse operation of the configuration parameters in the target object request message. In other embodiments, the processor request that the target device execute the rollback stack includes executing the rollback stack as an operator-defined function according to an order specified by an operator-defined operation. In some embodiments, the operator-defined operation includes a plurality of formula parameter types customized at the time of operation. In yet other embodiments, the second target object request message is associated with a second target device. In some embodiments, the request to transmit a target object request message to the target device includes a sequence of request messages for a plurality of target devices defined by the data template sequence of the model-based provisioned template. In some embodiments, the processor is further configured to repeat each of steps b)-h) for each of the plurality of target devices.

In some embodiments, the systems and methods are further configured such that the processor can transmit a notification indicating unsuccessful execution of the target object request message after restoring the target device to the pre-request state. In some embodiments, the configuration parameters include an importable form, the importable form being associated with data that is importable from a server into the database. In some embodiments, the model-based provisioned data template includes a sequence of target device types defined by an operator including at least one of Unified Communications as a Service (UCaaS), Zhone, Video Surveillance as a Service (VSaaS), Packet Data Network Gateway (PGW), Serving Gateway (SGW), Policy and Charging Rules Function (PCRF), Home Subscriber Server (HSS), iNum, and Telecom Application Server (TAS). In yet other embodiments, the inverse operation has a plurality of parameter types, each of the plurality of parameter types including an operator-defined function that defines additional parameter fields beyond those in the target object request message. In some embodiments, transmitting the target object request message includes a target-device specific operation capable of preserving the pre-configuration data associated with the target device. In some embodiments, receiving data associated with the request to transmit the target object request message further includes determining whether auto-routing of the target device type is enabled within the model-based provisioned data template. In some embodiments, the target device type protocol comprises at least one of representation state transfer (REST) protocol, structured query language (SQL) protocol, simple object access protocol (SOAP), secure files transfer protocol/secure shell protocol (SFTP/SSH), simple network management protocol (SNMP), and network and configuration protocol (NETCONF).

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
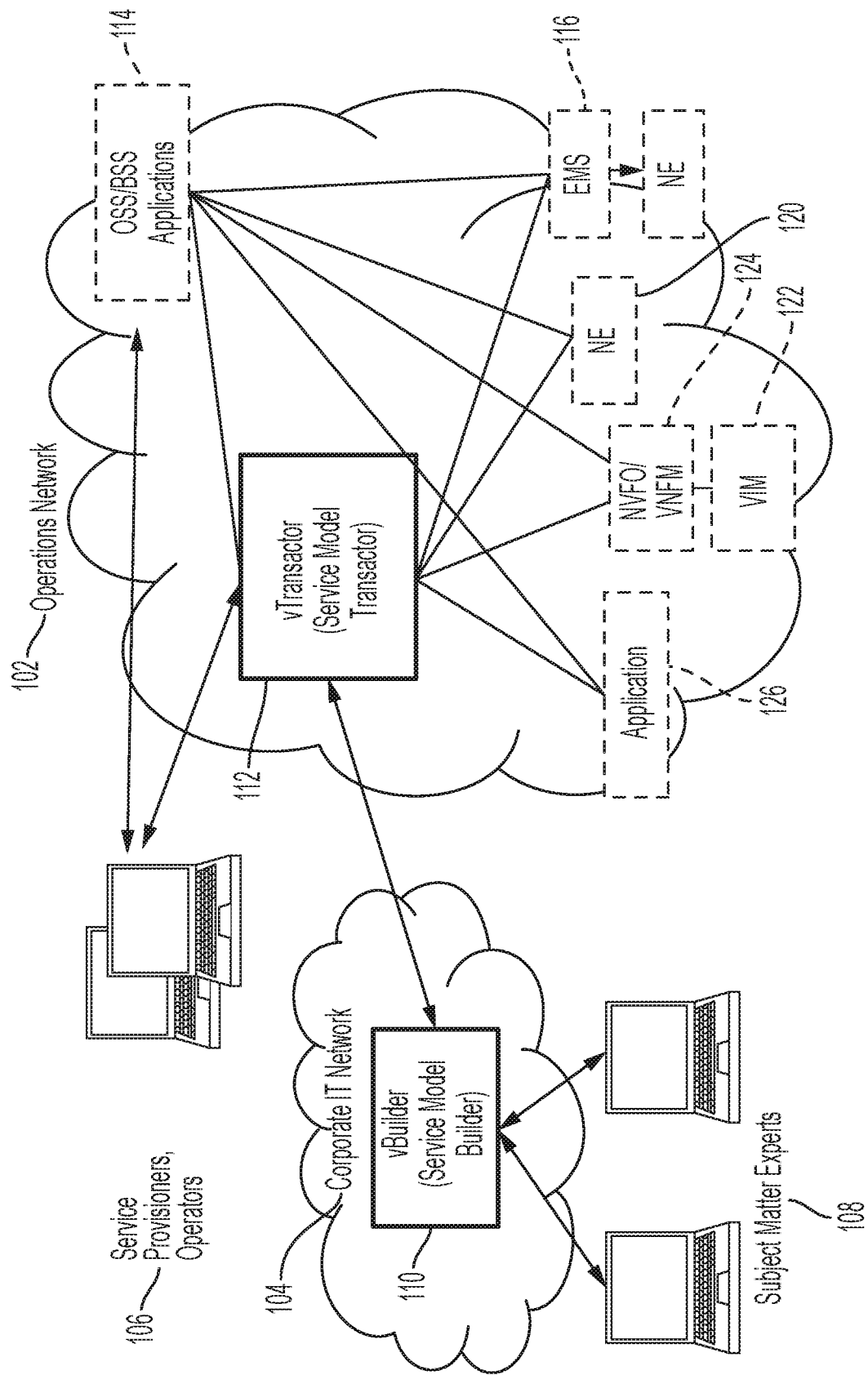
FIG. 1 is a system diagram showing a service automated platform deployment, according to some embodiments of the present disclosure.

In some embodiments, techniques are disclosed for an automated distributed system service rollback. The techniques disclosed herein allow for reusable service models, attributes, and target elements that can be customized for various distributed network applications and devices. The techniques described herein may be implemented to provide service rollback for data integrity of enterprise services management (ESM) using an application programming interface (API). Common ESM applications include telco networks, infrastructure networks (e.g. power networks, water management, public utilities, etc.), and process automation, among others. For purposes of clear explanation, the disclosure will refer to a telco network as representative of ESM distributed networks.

Telco provides a sufficient exemplary embodiment due to the complexity of the implemented devices within a telco distributed network. For example, network function virtualization (NFV) is not just about turning up new virtual network functions (VNFs)/virtual machines (VMs). Many VNFs are long-lived and multi-tenant. Many VNFs have complex, lengthy data chains.

As another example, service function chaining (SFC) can increase rollback challenges. VNFs in an SFC tend to be long-lived and multi-tenant representing lengthy data chains. Coordination of policy is not completely solved by SFC (e.g., VNF may not know which policies are associated to a service function path (SFP) ID).

True end-to-end carrier services can require broad coordinated data collection for a rollback, for example across a control plane (e.g., MME, RADIUS, PCRF, OCS, OFCS, PE routers) and various internal applications.

Service modeling can take too long (e.g., time it takes to define the service and how to realize it in the network) and are not automated enough (e.g., Metamodel Oriented Programming (MOPs) expressed as Word document with corresponding checklist).

Data driven approaches to automation have been utilized for quite some time in the form of scripts. At some level, the use of scripts to drive automation is data driven in that the script, itself, represents the data. Additionally, scripts are "fire and forget," resulting in no stateful representation of the effects achieved as a result of running the script.

While the scripting approach has been utilized in traditional information technology (IT) settings, for some time, it has not largely crossed over to the provisioning of telco applications. Unlike the typical telco application, the typical IT application is often configured at time of deployment with little or no need to incrementally reconfigure it. In contrast, telco applications require service configuration validation to ensure that the intended artifacts in the network are still provisioned as expected.

Attempts have been made to ease the integration of telco application configuration into automation frameworks, but each requires code writing by the developer of the automation platform, in the end, to accomplish the integration of the new devices, services, or procedures. In contrast, the approach described herein is entirely data driven and agentless where the end user of the solution provides all data necessary to model the required automation procedures.

Telco applications are also usually agentless. An agent-based approach allows clients (e.g., applications) to pull the required configuration from a server (e.g., an agent running on a server or virtual machine (VM) asking the server which software packages it should install). In contrast, without an agent, a central "manager" must push all required manipulation at the various clients. Telco applications tend to be agentless because of the variety of vendors and types of applications (e.g., routers, DNS servers, PCRF's, PGW's, etc.). This is in contrast to a homogeneous environment with agent-based targets (e.g., executing transaction-based data backup or multiversion currency control procedures).

A model-driven rollback approach, as described herein, refers to a system that provides to the network all of the information required in order to manage a rollback automatically in the instance of a service implementation anomaly. The system, as described in some embodiments, does not require a separate rollback for each network device. Instead, the system can enable a rollback of said devices in a dynamic fashion. As described herein, this agentless approach can be used in applications, such as telecommunications, where deploying a ubiquitous (e.g., deployed everywhere) agent to rollback all relevant network data and applications is impracticable.

Embodiments described herein use rollback procedures within distributed end-to-end networks using an automated model-driven framework. The approach described herein is entirely data driven and agentless where the end user of the solution provides to the model all data necessary to execute the required automation procedures for a rollback in the event of service failure.

In order to unburden the end-user from the problems described herein, a service model language can be used to describe any and all automation procedures. In some embodiments, the systems and methods described herein use Extensible Markup Language (XML) to create a language that allows the expression of a generalized sequence of actions occurring over a supported transport such as Secure Shell/Command Line Interfaces (SSH/CLI) to some set of target entities. In some embodiments, this language is expressive enough to also capture if/else logic in order to handle any range of executable versions within the set of target devices.

Such an approach can be object oriented, allowing the life-cycle management of abstract service instances, which can include collections of supported native object instances on the targets that have been selected. Such service instances can be created, deleted, modified, checked for synchronization with the underlying targets, forced into synchronization on the underlying targets, checked for status, and harvested for statistics.

The approach described herein can support any required transport protocols towards the desired target devices, including Network Configuration Protocol (NETCONF), Simple Network Management Protocol (SNMP), command-interface (CLI)/Secure Shell (SSH), SSH File Transfer Protocol (SFTP), Representational State Transfer (REST), and Simple Object Access Protocol (SOAP)/XML.

In some embodiments, services are modeled using a service model builder (also referred to herein as vBuilder). As described in more detail below, service model builder allows subject matter experts (SMEs) to build models for network operators to execute for creating and managing the services. In some embodiments, the system described herein provides a GUI-based end user device with no coding needed and no in-built product-specific adapters. In some embodiments, a reusable model definition by SME is used. As described in more detail below, one example of a reusable model definition is a service attribute used for multiple target devices. In some embodiments, the system described herein allows for flexible argument handling and propagation and can be modified to support any target device or application over any transport connector (e.g., NETCONF, REST, SOAP, SNMP, Java Structured Query Language (JSQL), CLI/SSH). In some embodiments the system described herein supports multi-versioned targets to execute a service across the network elements in a single event (referred to herein as a "service model rollout" or "rollout").

In some embodiments, the system described herein provides a service model rollback procedure (rollback) as the reverse of the service model rollout. In reversing the rollout procedure, the service model transactor performs the steps of the service model rollout in the reverse order. Additionally, the service model transactor also performs the opposite of each service model step executed within the rollout in order to revoke the operation in the rollout and return the network element to its pre-service status. In other embodiments, the service model transactor performs the steps of the service model rollout in a reverse order such that the service model transactor performs the opposite of each service model step supplemented by additional steps as defined by the SME in the service model. Such steps could include disabling a user before deleting a user's account, updating a user's billing information, QoS policy, rating group, or creating a new service rule applied to an MVNO.

In some embodiments, the system described herein provides rollback with a service model transactor (also referred to herein as vTransactor). Service model transactor can import completed service models from the service model builder. In some embodiments, services are triggered via GUI or programmatically using NorthBound Application Programming Interface (NB-API). NB-API could be REST/JSON, REST/XML or TCP-based Customer Administration Interface (CAI) protocol. The services can include Create/Modify/Delete, Status, Statistics, and User-defined Actions. In some embodiments, the system described herein can track instantiated service instances, such as configuration synchronization/check, status with aggregation across targets, and statistics regarding rollout across targets.

FIG. 1 is a system diagram showing a model-based service platform deployment, according to some embodiments of the present disclosure. FIG. 1 shows operations network 102, corporate IT network 104, interface for operators 106, interface for subject matter experts (SMEs) 108, service model builder (also referred to herein as vBuilder) 110, service model transactor (also referred to herein as vTransactor) 112, Operation Support System/Business Support System (OSS/BSS) applications 114, element management system (EMS) 116, network element (NE) 118, NE 120, virtual I/O module (VIM) 122, NFV Orchestrator/virtual network function manager (NFVO/VNFM) 124, and application 126.

Service model builder 110 can be deployed as a tool in a corporate network 104. In some embodiments, the target users are SMEs 108. SMEs 108 can communicate with service model builder 110 through a web service architecture, such as REST. Service model builder 110 specifies how to build models that are suited for repetitive invocations of a service implemented across the devices in the network. As described in more detail below, service model builder 110, in some embodiments, allows SMEs 108 to specify how an operator can manipulate customer data by enabling the operator 106 to create, retrieve, update, and delete service instances. Service model builder 110 also allows SMEs 108 to specify how service model transactor 112 is to respond to service model execution failures or anomalies. SMEs 108 may build a service model 115 (not shown) using a native vendor schema object as a target object or a target element, described further herein (e.g., QoS policy, billing plan, HSS, Encapsulated Post Script Subsystem (EPSSUB), IP Multimedia Subsystem (IMSSUB), or International Number Name Authority Pointer (iNUM Naptr), or Network Management System (NMS) CreateSpecProc etc.). Coding and product-specific adapters are not needed in the system described herein at least in part because the service model 115 can be constructed by a SME 108 importing configuration object model schemas (e.g., router Vendor X's Yet Another Next Generation (YANG) modules) as well as a user's data entry via direct interaction with a service model builder's GUI in order to define a "pseudo-schema" for applications that do not provide a machine readable schema. An example of this is an application or network function that is managed solely with a command line interface (CLI). The application provider may often publish a CLI user's guide in a PDF file (e.g., it is possible to publish a machine readable format such as a Backus-Noir-Form (BNF), but that provides only syntax and not semantics). In the CLI document example, there is effectively no "official" schema for the application.

Service model transactor 112, which resides in an operations network 102, allows an operator 106 to provision services based on the service model 115 received from service model builder 110. Operators 106 can communicate with service model transactor 112 through a web service architecture, such as REST. Service model transactor 112 utilizes the models in order to execute service instances (e.g., create, retrieve, update, delete) in the form of a rollout. Service model transactor 112 may include random access memory. For example, a service instance could include deleting a user's account, updating a user's billing policy, QoS rules, account identifying information, data plan capacity, or other account information.

Service model transactor 112 can also talk to all other components (e.g., OSS/BSS applications 114, element management system (EMS) 116, network element (NE) 120, virtual I/O module (VIM) 122, NFV Orchestrator (NFVO)/virtual network function manager (VNFM) 124, and application 126) over a set of supported connectors or protocols. A model can be created from at least one of a priori knowledge of protocols or device related to service instantiation, and from protocol and device type detected by the service model 115. Operator 106 can instantiate a service (i.e. rollout) through service model transactor 112 by providing to the service model 115 information particular to a specific target instance. Service model transactor 112 can specify parameters to OSS/BSS applications 114, element management system (EMS) 116, network element (NE) 120, virtual I/O module (VIM) 122, NFV Orchestrator (NFVO)/virtual network function manager (VNFM) 124, and application 126 to instantiate a service. Service model transactor 112 can also specify parameters to an OSS/BSS application 114 with further instructions to configure element management system (EMS) 116, network element (NE) 120, virtual infrastructure manager (VIM) 122, NFV Orchestrator (NFVO)/virtual network function manager (VNFM) 124, and application 126 to instantiate a service. Service model transactor 112 can communicate with other operations network elements through a protocol/connector supported by the system (e.g., at least one of REST, SOAP, and NETCONF).

OSS/BSS applications 114 can be used to manage and support end-to-end telecommunications services. OSS includes management functions such as service provisioning. BSS include components that manage business operations for a telecommunications services provider. EMS 116 manages network elements 120 in a telecommunications network. NFVO/VNFM 124 manages and orchestrates NFV resources. VNFM manages VNF lifecycles. Application 126 refers to a telecommunications application.

As described herein, service model builder 110 is data driven. To automate the manipulating of customer information process, SME 108 can use combinations of one or more vendor schema objects and one or more annotated target elements to limit the configuration parameters for each component that needs to be specified by operator 106. As described in more detail below, a SME 108 can include combinations of annotated target elements in a single attribute as well as specify relationships between the target elements. Service model transactor 112 supports protocols that configure products, thereby lending itself to configuring the products themselves. A service model 115 can specify at least some of the parameters that are needed for each protocol. In some embodiments, SME 108 can simplify a model by hard-coding certain attributes that are otherwise flexible from the target's perspective and/or specify constraints that are more restrictive than the target's own constraints. In some embodiments, actual values that ultimately satisfy all constraints are processed by the service model transactor 112 during execution of an operation (e.g., create, update, etc.).

One example of a service carried out using a service model is when a wireless carrier updates a customer's information directly (e.g., AT&T® onboarding FedEx®) or when a wireless carrier updates a subsidiary customer (e.g., AT&T® onboarding a mobile virtual network operator (MVNO)) such as Cricket Wireless). Another example is when a wireless carrier deletes or adds a customer from or to its network, respectively. In some embodiments, updating a customer's information requires configuration of multiple touch points, as described in more detail below with FIG. 2.

Figure 2:
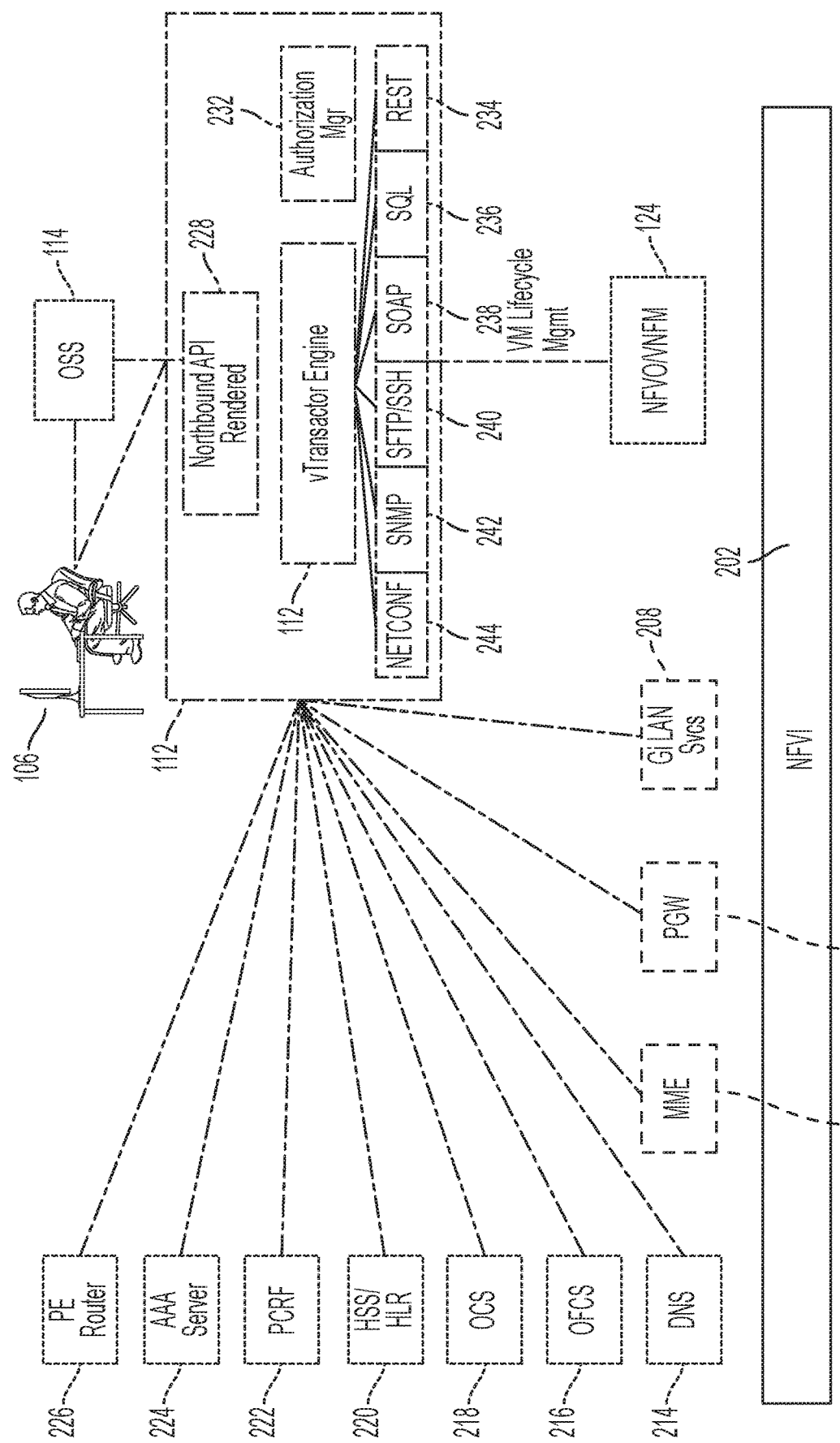
FIG. 2 is a system diagram showing manipulation of information with a mobile virtual network operator (MVNO), according to some embodiments of the present disclosure.

FIG. 2 is a system diagram showing an automated service in a MVNO, according to some embodiments of the present disclosure. FIG. 2 shows service model transactor 112, network function virtualization infrastructure (NFVI) 202, OSS 114, NFVO/VNFM 124, Gi LAN Services 208, Packet Data Network Gateway (PGW) 210, Mobility Management Entity (MME) 212, Domain Name Server (DNS) 214, Offline Charging System (OFCS) 216, Online Charging System (OCS) 218, Home Subscriber Server/Home Location Register (HSS/HLR) 220, Policy and Charging Rules Function (PCRF) 222, Authentication, Authorization, and Accounting (AAA) server 224, Provider Edge (PE) Router 226, northbound application programming interface (API) renderer 228, service model transactor 112, authorization manager 232, representation state transfer (REST) protocol 234, structured query language (SQL) protocol 236, simple object access protocol (SOAP) 238, secure files transfer protocol/secure shell protocol (SFTP/SSH) 240, simple network management protocol (SNMP) 242, network and configuration protocol (NETCONF) 244.

NFVI 202 is a collection of compute, storage, and networking resources available for VNFs to utilize. In some embodiments, the system described herein can be used to manage virtual network functions, physical network functions or a combination of both virtual and physical network functions. As shown in FIG. 2, rolling out a service requires manipulation of a diversity of network elements. Manipulating each network element may occur as a series of steps directed toward each target in a systematic sequence as set by SME 108 within the service model 115, further described in detail below. For example, the step of changing data for PE router 226 can include configuring at least one of, or multiple instances of each of a border gateway protocol (BGP) virtual routing function (VRF) and multiprotocol label switching (MPLS) BGP/MPLS VRF; changing data of AAA Server 224, PCRF 222, and HSS/HLR 220 can include configuring at least one of access point name (APN) policy mapping and international mobile subscriber identity (IMSI) policy mapping; changing data of OCS 218 and OFCS 216 can include configuring APN to MVNO mapping; changing data of DNS 214 can include configuring APN and PGW C-name records; changing data of MME 212 can include configuring APN Operator Policy and PGW selection policy; and changing data of Gi LAN Services 208 can include configuring PGW, APN, user equipment (UE) pools, BGP/MPLS VRF, workflow control, and data profile. Gi is the interface from GGSN/PGW to the Internet. In some embodiments, various value-added services are inserted between the GGSN/PGW and the Internet. Those entities are referred to as GiLAN or Gi LAN. For example, a GiLAN service 208 can include configuration of policy and behavior for HyperText Transfer Protocol (HTTP) Proxy, Transmission Control Protocol (TCP) Proxy, HTTP Content Filtering, Network Address Translation (NAT), or Firewall. As described herein, operator 106 through a northbound API renderer 228, can execute multiple service models 115 through service model transactor 112 to manipulate data within network elements in order to create, retrieve, update, or delete a service instance through a supported protocol (e.g., REST 234, SQL 236, SOAP 238, SFTP/SSH 240, SNMP 242, NETCONF 244). Service model transactor 112 may further include a routing engine capable of communicating with network elements to determine if a network element is operational. Service model transactor 112 may also include a Target Type protocol specific connector for communicating with network elements. The Target Type protocol specific connector is capable of pushing target specific request messages to network elements as required by numerous individual network element protocols described herein.

In contrast, prior art techniques required either 1) manual application to each network element as part of service instantiation; or 2) an inflexible system supporting only a few subsets of services designed at high cost by an IT department or a scripting approach that retains inadequate state to validate previous configurations on an ongoing basis. As described in more detail herein, the process of manipulating customer data is automated using the systems and methods described herein by information that a SME enters: 1) a first layer including a service model, 2) a second layer including attributes, 3) a third layer including a) vendor schema objects (VSOs) natively seen by the target device, and b) a VSO annotated by an SME (also referred to herein as a "annotated target element" or "target object"). Verbs (e.g., CRUD) are a behavioral aspect of all layers.

In some embodiments, at the third layer, there is a 2-stage modeling approach—first import or define the target's native representation of a resource (e.g., object) and second to decorate or annotate that native representation in order to specify more restrictive constraints, perform data hiding via hard-coding of certain attributes, or simplification via coalescing (e.g., combining) multiple attributes. The aspect of the model that pertains to each of the CRUD verbs can be referred to as facets of the model—the VSO/annotated target elements—all have a create facet, update facet, etc., to represent the verb-specific aspects of the model. In some embodiments, one aspect of a resource or object model that is not verb-specific are the key attributes that uniquely identify an instance of the resource. Those attributes are fully specified in order to execute the verbs.

A vendor schema object, as described in some embodiments of the present disclosure, is a representation of the precision and flexibility afforded to the object by the native application—e.g., in the CLI interface there may be a static route object, for example, that has a certain way of uniquely identifying instances of it, has certain mandatory attributes, certain optional attributes and that attributes have types and possibly constraints. Once the vendor schema object is established (e.g., imported by a SME), further refinement is allowed in the form of additional constraints, data hiding, and other operations such as coalescing attributes such that multiple attributes will always be provided identical values. For example, one can create an annotated target element based on the static route vendor schema object by restricting it to only use IPv4 addresses. In a different annotated target element based on the same vendor schema object, a restriction might be to only allow IPv6 addresses.

Authorization manager 232 enables some secondary functionality in some embodiments of the system described herein. A service instance that is created can be designated such that only a subset of operators may further act upon it (update, delete, etc.). For example, a Cricket MVNO and a Jasper MVNO can be created by a transactor, based on the MVNO model or recipe that is designed by SMEs 108. There can be one team of operators that may modify only the Cricket MVNO and a distinct team that may modify only the Jasper MVNO.

Figure 3:
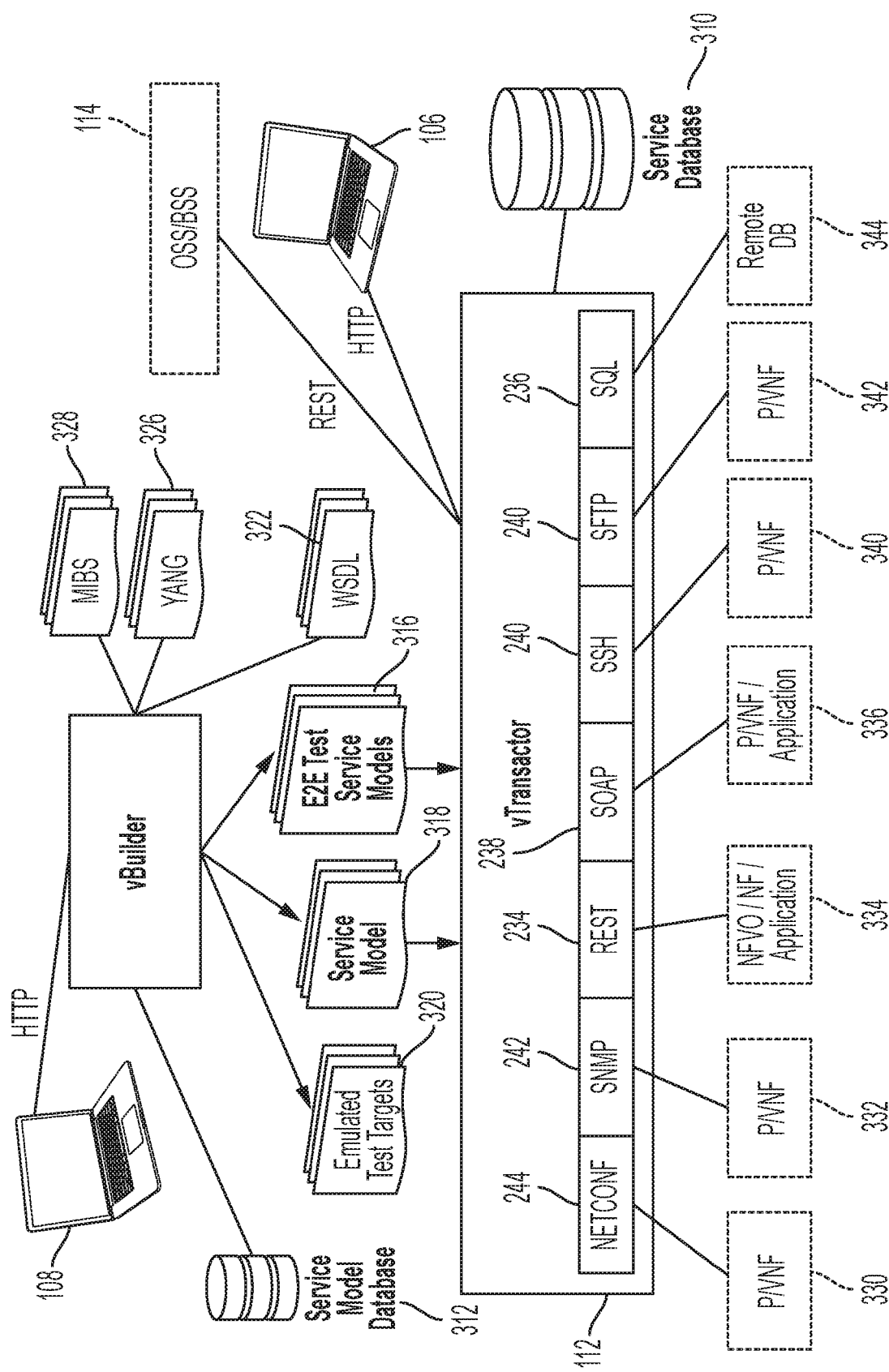
FIG. 3 is a system diagram of a service model builder and a service model transactor, according to some embodiments of the present disclosure.

FIG. 3 is a system diagram of service model builder 110 and service model transactor 112, according to some embodiments of the present disclosure. FIG. 3 shows service database 310, service model database 312, end to end (E2E) test service models 316, service models 318, emulated test targets 320, Web Service Definition Language (WSDL) 322, XML Schema Definition (XSD) 324, Yet Another Next Generation configuration object modeling language (YANG) 326, Management Information Base (MIBS) 328, Physical/Virtual Network Function (P/VNF) 330 332 340 342, NFVO/NF/Application 334, P/VNF/Application 336, and remote database 344.

Service database 310 includes a record of service instantiated by service model transactor 112. As described in more detail below, the record of service can include service instances, target types and target instances. Service model database 312 includes a record of service models 115, attributes, vendor schema objects, and annotated target elements created by SME 108 through service model builder 110. Service model database 312 may be owned by the system operator, the manufacturer of the specific target types, or an independent third-party database operator associated with the system.

Emulated test targets 320 allow SMEs 108 to execute service models 115 in a simulated environment for testing, debugging and modification. Emulated test targets 320 refer to an emulation that can be defined by SME 108 of a target like a PCRF in terms of request/response pairs. This allows first level testing of attributes that are intended for PCRF, even before deployment on service model transactor 112. Emulated test targets 320 will provide the exact request message in the target device native form that will go to the target device. SME 108 or operator 106 may verify the request message before implementing the rollout in the live system.

Service model builder 110 can utilize service models in two ways: E2E test service models 316 (also referred to herein as a "dry-run") and service model execution 318. E2E test service models 316 can verify the behavior of a service instance that was created via a service model 115. E2E test service models 316 not only test that the configuration is correct and current, it can also test true end to end behavior which can be affected by operational conditions such as physical link status on various router-to-router links, etc. For example, instead of the usual CRUD lifecycle management of service instances, the systems and methods described herein can be used to model the invocation of and collect and interpret the results of an active test that may be used for service verification. For testing a service model, SME or operator would send the flag "dryRun=true", which will cause it to output the actual messages that would go to the target. It will do all steps of execution except pushing to the real target device. It can be triggered to conduct the test and queried as to the results of this test. No actual service instance is created in this example and is instead a stateless action. As described in more detail herein, service models 318 can be designed by SMEs 108 for use by operators 106 to instantiate services.

Service models 115 can be designed to communicate with applications that are managed via SOAP/XML and publish a corresponding Web Service Definition Language (WSDL) 322, Yet Another Next Generation (YANG) 326, JavaScript Object Notation (JSON), and/or Management Information Base (MIBS) 328. WSDL 322 is an XML format that defines services as collections of network endpoints capable of exchanging messages. YANG 326 is a language for NETCONF that is modular and represents data structures in an XML tree format. MIBS 328 allows a network management system to monitor database objects.

As described herein, service model transactor 112 can receive service model 115 that can utilize any number of protocols (e.g., representation state transfer (REST) protocol 234, structured query language (SQL) protocol 236, simple object access protocol (SOAP) 238, secure files transfer protocol/secure shell protocol (SFTP/SSH) 240, simple network management protocol (SNMP) 242, network and configuration protocol (NETCONF) 244). Each protocol can be associated with and used to specify a configuration of a P/VNF 330 332 340 342, NFVO/NF/Application 334, P/VNF/Application 336, and remote database 344. For example, NETCONF can be used with YANG enabled routers (e.g., Juniper routers, Cisco routers). As described in more detail herein, YANG files are published by an application provider (e.g., an "enterprise" YANG model) and/or standardized (e.g., released by Internet Engineering Task Force (IETF) in a Request For Comments (RFC)), and that can be dragged into a service model builder 110 workspace to specify a workflow (e.g., QoS flow). Other protocols include REST, SOAP, and command line interface (CLI). NETCONF protocol is generally paired with YANG schema, SNMP protocol is generally paired with MIB schema, SOAP/XML protocol is generally paired with WSDL schema, and REST and CLI protocols generally have no formal schema.

Figure 4A:
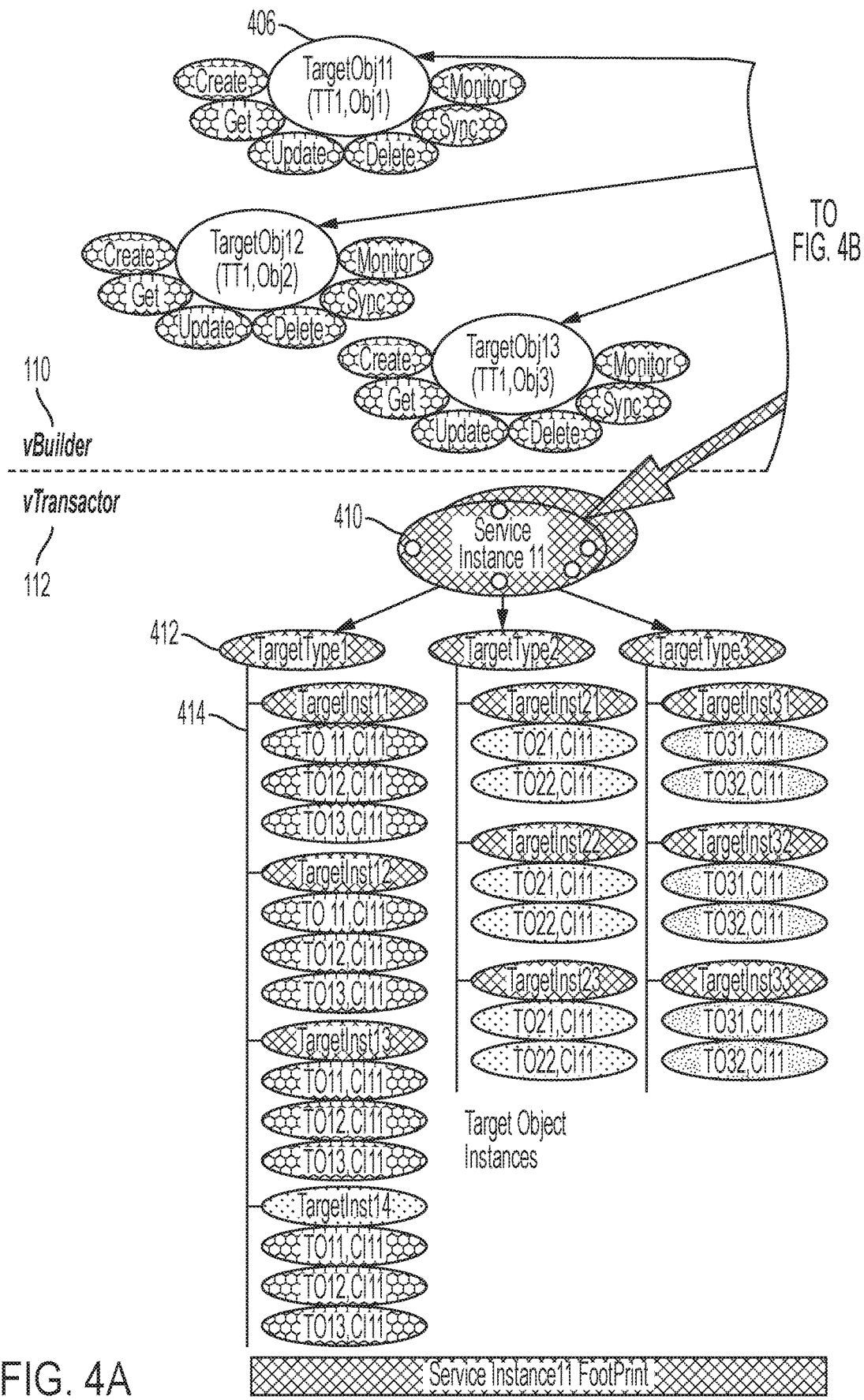
FIGS. 4A-4C are an object relationship diagram of service instances management, according to some embodiments of the present disclosure.
Figure 4B:
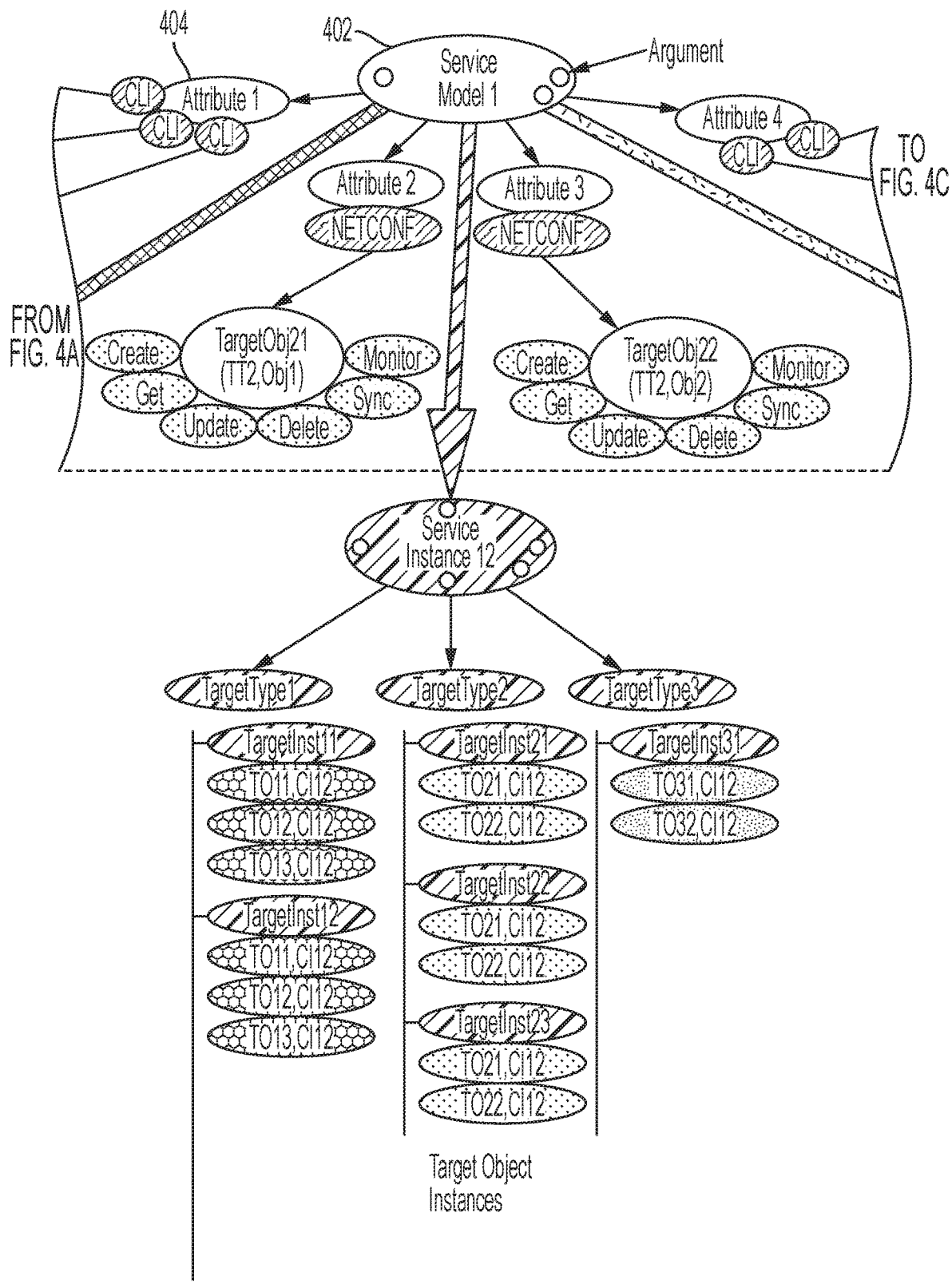
Figure 4C:
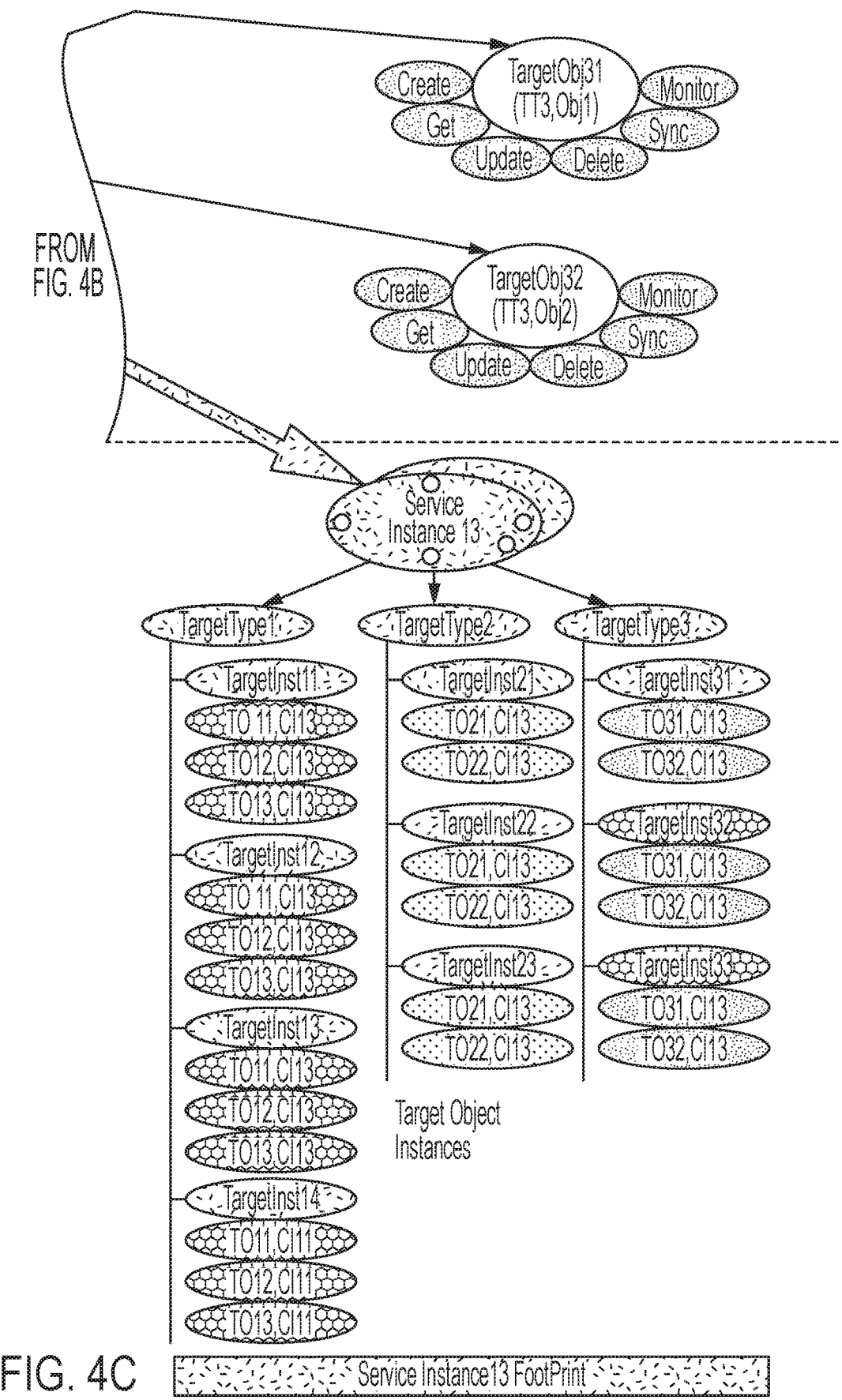

FIGS. 4A-4C are an object relationship diagram of service instances management, according to some embodiments of the present disclosure. FIGS. 4A-4C show a service model 1 402, attribute 404, and target element 406 associated with a service model builder 110; and a service instance 410, target type 412, and target instance (or target device) 414 associated with a service model transactor 112.

As shown in FIGS. 4A-4C, the elements above the line show some embodiments of the systems and methods described herein from a service model builder's 110 perspective (e.g., a service model 115); the elements below the line show some embodiments of the systems and methods described herein from the service model transactor's 112 perspective (e.g., the results of executing the model in order to create service instances). In particular, the artifacts that have been configured into the network in terms of which target instances are involved (e.g., which PE router instances and what native objects or resources, including all their associated values), have been created on those target instances (i.e., VRFs, MP-BGP peering sessions, etc.). From service model builder's 110 perspective, service model 1 402, attributes 404, and target elements 406 are created and linked to be deployed on service model transactor 112. The first time a service command is issued (e.g., to create a customer) associated with service model 1 402, a service instance 410 is created. The multiple service instances 410 represent each service instance that was created based on service model 115 represented by service model 1 402. The same service model 115 can be used to provision different service instances for different customers. A service instance can be created by executing the service model 115 (e.g., a delete command). In some embodiments, service model transactor 112 has a My Structured Query Language (MySQL) database to keep track of the hierarchies of the service instances and the target instances (or target device) 414 (also referred to herein as a footprint of the service instance, further described in connection with FIG. 8B).

Service model 1 402 can include multiple attributes 404. In some embodiments, each attribute 404 is associated with one or more target types 412. In some embodiments, target type 412 comprises a device type (e.g., router). Attribute 404 can include at least one of a target element 406 (also referred to herein as a "target object") as constrained by a same target type and same Target Type protocol specific connector type. Target element 406 includes an object (e.g., VNF, PNF, application) that has to be configured in order to create a service instantiation. For example, target elements 406 include CRUD semantics (e.g., create, retrieve, update, and delete).

As described herein and referring to FIG. 1, service model 115 can be created by a SME 108 to minimize the amount of manual configuration performed by operator 106 to instantiate a service. In some embodiments, service model 115 can be hard coded by SME 108 eliminating the need for significant configuration by the operator 106. In some embodiments, service model 115 can have open fields to take inputs from the operator 106. For example, service model 115 may leave open fields specifying for each VRF, a unique route discriminator integer value. Service model 115 can expose this value as a required argument for the operator 106 to provide. In some embodiments, service model 115 can contain an open field comprising a logic input (e.g., if/else) such that the field is filled based on device manipulation.

One implementation of a service instance 410 includes one or more target types 412 as specified by an attribute 404 associated with the service model 1 402 from which the service instance 410 is defined. In some embodiments, a target type 412 includes one or more target instances 414. Target instance (or target device) 414 is an instance of a VNF, PNF or application that actually exists (e.g., a Juniper router a Cisco router) and that a target instance 414 can talk to. Each target instance 414 is associated with a database of service instances 410 and associated footprints and artifacts, as described herein. In some embodiments, at run time, service model transactor 112 can ask operator 106 to specify a number of instances. In some embodiments, all of the parameters for each of the many service instances 410 can be specified in a format (e.g., spreadsheet) that the service model transactor 112 can consume.

Figure 5A:
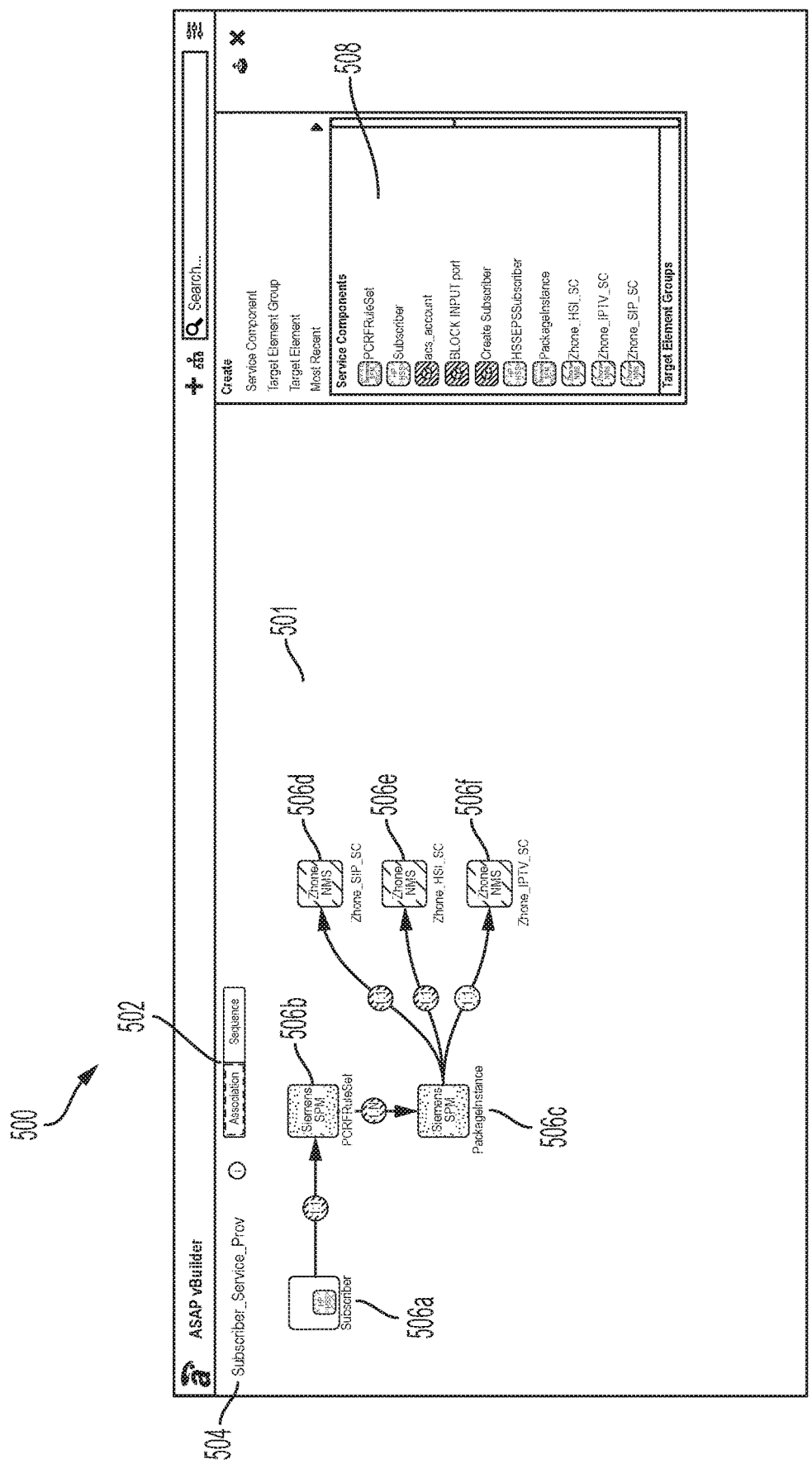
FIG. 5A is a screenshot showing a service model builder user interface with service-component associations including a service model section and an attribute section, according to some embodiments of the present disclosure.

FIG. 5A is a screenshot showing a service model builder user interface with service-component associations including a service model section and an attribute section, according to some embodiments of the present disclosure. FIG. 5A shows a service model builder user interface 500, service model view selection 502, service model section 504, service components 506a-f, and service component listing sections 508 for a service model 501. Service model builder user interface 500 may be part of an operator-labeled system, such as the Affirmed Service Automation Platform ("ASAP").

Service model section 504 includes a field for receiving or setting a service model name. Service model section 504 also includes workspace for adding service components and their associations within the service. As described herein, each of the attributes 404 can include at least one of vendor schema objects and annotated target elements. For example, as shown in FIG. 5A, service model section 504 may contain 6 service components 506a-f for the service model name for provisioning a subscriber and subscriber services. In some embodiments, a service component 506a-f represents a type of record or records. In FIG. 5A, a subscriber service component 506a represents a set of subscriber records in various underlying target types. FIG. 5A also shows, for example, the associations among the service components 506a-f (representing types of records) and a subscriber record is associated with a Policy and Charging Rules Function (PCRF) ruleset. A subscriber record, in the form of service components 506a-f may also be associated with multiple packages like Basic package, Premium package, Pre-Paid package, among others. Each package may need to be provisioned on the network for intended service using Network Management Service (NMS) service components 506d, 506e, and 506f.

Relationships between the number of service components 506a-f can include such associations as 1:1 (one-to-one association), 1:N (one-to-many association) or M:N (many-to-many association). Service components 506a-f may be executed or rolled out independently or in combination of all other service components of service model 501. It means, for an existing subscriber a new package can be added, an existing package can be deleted, or existing package can be updated as part of the service execution (i.e. rollout). In some embodiments, service components 506a-f may maintain a hierarchical relationship with other peer service components 506a-f (i.e. a parent-child relationship). In such an embodiment, a child service component can inherit attributes from its parent. For example, in FIG. 5A, representative service component 506b as PCRFRuleSet service component may inherit subscriber identity attributes, such as International Mobile Subscriber Identity (IMSI) and Mobile Station International Subscriber Director Number (MSISDN), from service component 506a (Subscriber service component). This way, at the time of service model's 501 execution, operator may provide the attributes IMSI and MSISDN values at one time.

Figure 5B:
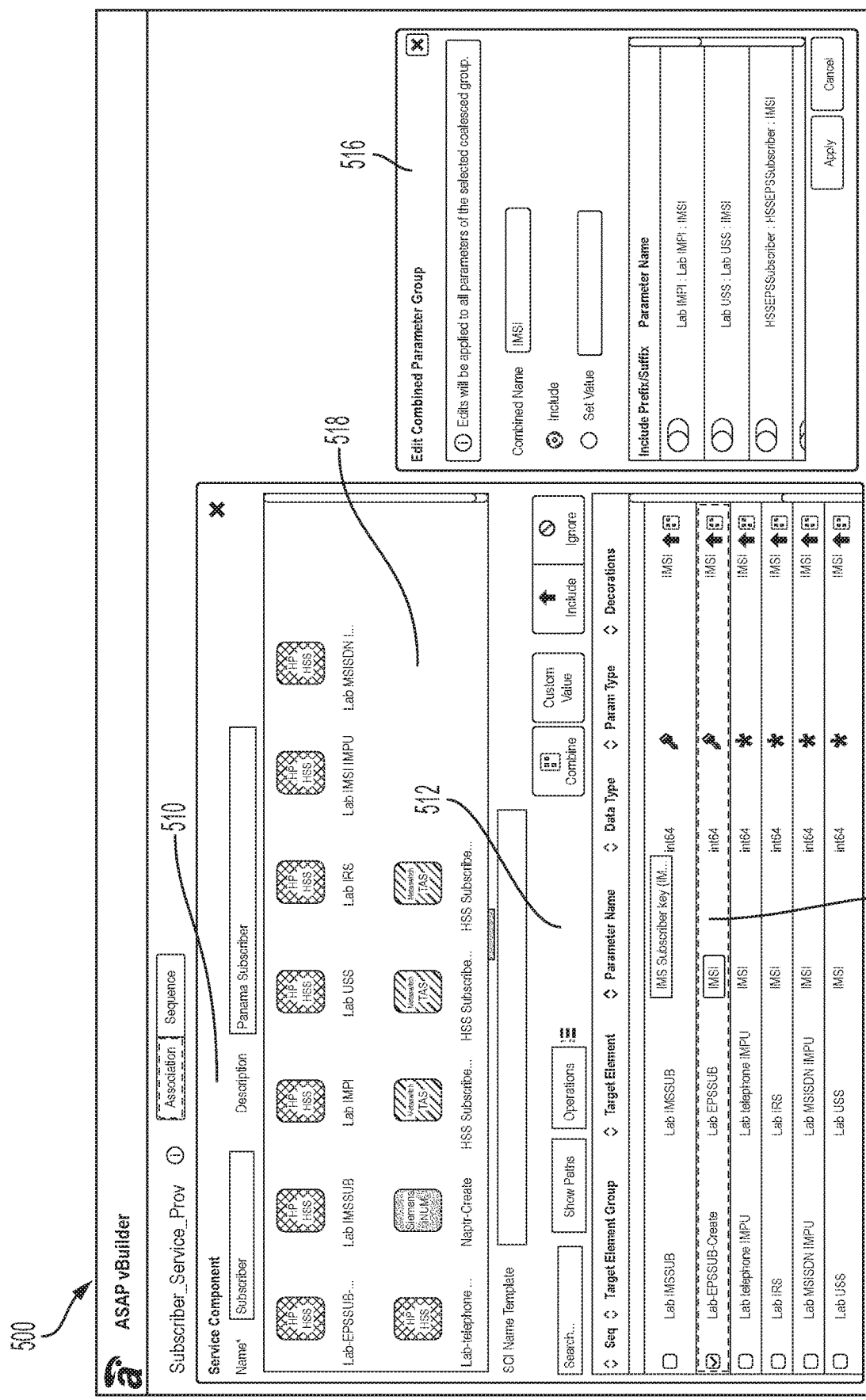
FIG. 5B is a screenshot showing a service model builder user interface with a parameter view of one service component including a service component parts section, a service component attribute section, and a service component attribute editing section, according to some embodiments of the present disclosure.

FIG. 5B is a screenshot showing a service model builder user interface with a parameter view of one service component including a service component parts section, a service component attribute section, and a service component attribute editing section, according to some embodiments of the present disclosure. Service model builder user interface 500 includes a service component parts section 510 and a service component attribute section 512. Service component attribute section 512 lists attributes needed for executing the service components 506a-f. Service components attribute section 512 can include attributes that are part of underlying annotated Target Elements (TEs) and Vendor Schema Objects (VSOs). Similar attributes from the attribute list can be combined or coalesced using service components attribute section 512. For example, as shown in FIG. 5B, multiple underlying records using International Mobile Subscriber Identity (IMSI) may be combined as one IMSI so that operator may give one IMSI value for provisioning a subscriber in different target types. An Coalesce (Combine) section 516, as shown in FIG. 5B, allows SME 108 to combine attributes. For example, coalesce section 516 may combine all attributes using IMSI in underlying target elements (TEs) as Evolved Packet Core Subscriber for Lab Environment (LAB-EPSSUB), Multimedia Subscriber for Lab Environment (LAB-IMSSUB), Implicit Registration Set for Lab Environment (LAB-IRS), etc. SME 108 may also set a hard-coded value to IMSI or select the include toggle for the operator to supply the value for IMSI.

Included in service component parts section 510 is a list of Target Elements 518. The list of Target Elements 518 may be a set of Target Elements (TEs) or commands directed to an intended Network Element (NE). List of Target Elements 518 may be associated with a service component TargetType such as MCC, HSS, PCRF, TAS, NMS, etc., and a network protocol such as NETCONF, SOAP, REST, CLI, etc. All TEs within the list of Target Elements 518 can be pushed to the specified service component within one rollout session context, as further described with respect to FIGS. 9A-9B.

Figure 5C:
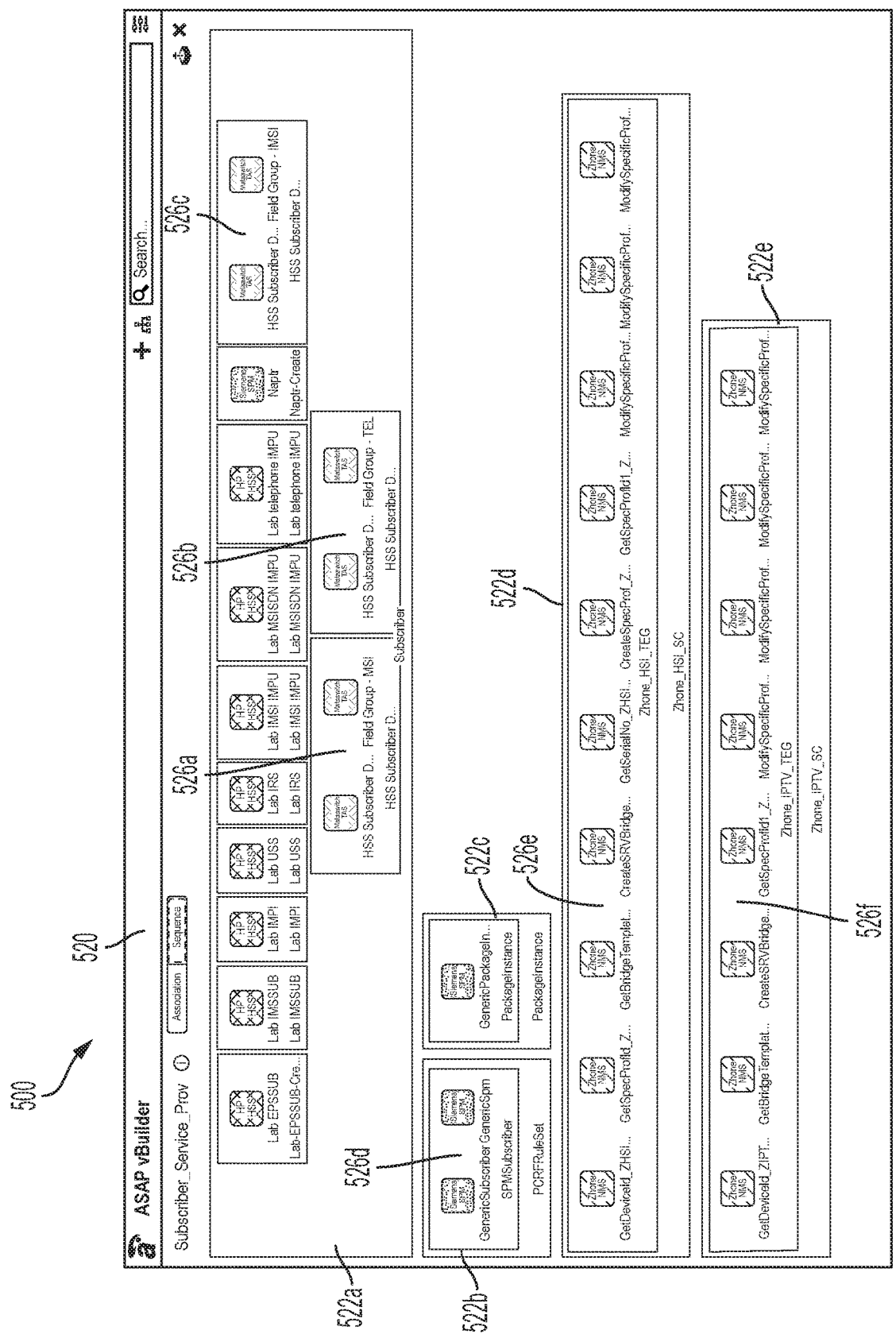
FIG. 5C is a screenshot showing a service model builder user interface with sequence view of service components including a service model sequence view separated into target element groups, according to some embodiments of the present disclosure.

FIG. 5C is a screenshot showing a service model builder user interface with sequence view of service components including a service model sequence view separated into target element groups corresponding to service model 501, according to some embodiments of the present disclosure. Service model sequence view 520 provides an illustration of a sequence of individual target elements separated into target element groups (TEG). Representative TEGs 526a-c correspond to target elements associated with the subscriber service component 506a in FIG. 5A and TEGs 526d correspond to target elements associated with the PCRFRuleSet service component 506b. Sequence windows 522a-e show the sequence of execution of the service model 501 for TEGs 526a-d. Sequence windows 522a-e display the sequence, in some embodiments, starting at the left of each of sequence windows 522a-e and tracking each target element to the right beginning with sequence window 522a at the top of service model sequence view 520. For example, as shown in FIG. 5C, sequence window 522a displays representative target element group (TEG) 526a that contains TEs corresponding to HSS Subscriber and Field Group, respectively. Likewise, TEG 526b associated with service component 522b for PCRFRuleSet includes the sequence of executing instructions for TEs corresponding to GenericSubscriber and GenericSpm. SME 108 may define executable instructions within the service model 501 corresponding to TEGs rather than defining attributes with respect to each individual TE.

Figure 6:
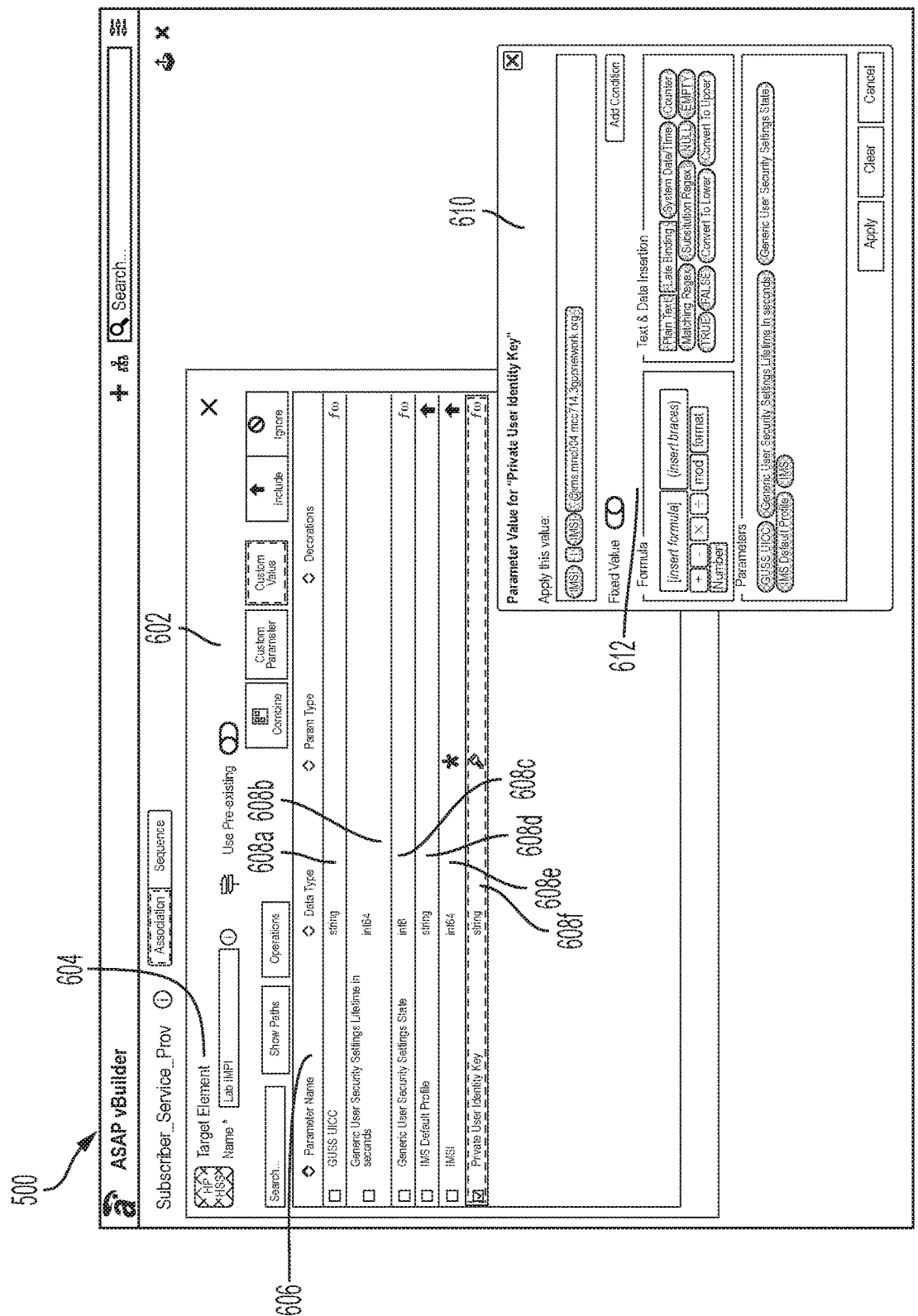
FIG. 6 is a screenshot showing a service model builder user interface with a target element parameter view of a service component including native target element representations, according to some embodiments of the present disclosure.

As shown in FIG. 6, service model builder user interface 500 further includes a target element section 602, which can be used to individually manipulate a representative TE of service model 501. FIG. 6 also shows an attributes section 606 of representative TE. Target element section 602 may include a TE name 604 that displays the native target element representation (e.g., as extracted from a vendor schema object). From one VSO, one or more TEs can be extracted, each having a different annotation. For example, in FIG. 6, TE name 604 includes an IP Multimedia Private Identity (IMPI) record of HSS for a Lab environment. For each intended environment or market segment, SME may extra a TE, name it appropriately, annotate the attributes for the environment, and build models. The attributes section 606 displays multiple attributes 608a-f of the Vendor Schema Object (VSO) of the HSS IMPI. SME 108 may choose to annotate each of individual attributes 608a-f. Each of attributes 608a-f can be ignored such that it may not be propagated to each of service components 506a-f. Each of attributes 608a-f can further be annotated as "include" to include it in service component attribute section 512, as shown in FIG. 5B.

Each of attributes 608a-f may also be annotated using a formula 612. As shown in FIG. 6, formula window 610 shows the details of annotating attribute 608f using formula 612. For TE 604, each of attributes 608a-f can be annotated using formula window 610 with each corresponding formula 612. For example, a local mobile number can be captured using a custom attribute and use it to construct IMSI with given market mobile network code (MNC) and mobile country code (MCC). Annotating each of attributes 608a-f with formula 612 puts more flexibility in the hands of SME 108. Using formula window 610, each attributes 608a-f can be set with a constant value, set the value using a string concatenation, or logically evaluate a value using a regular expression with if-then logic, among others. For example, as illustrated in formula window 610 of FIG. 6, IMPI key is being set using given IMSI for a specific market segment with mobile network code (MNC) and mobile country code (MCC).

Each of attributes 608a-f can also be set dynamically at the runtime using a LateBinding mechanism with response attributes or with system date & time that captures data regarding the selected service component as part of the executed attributes 608a-f. In some embodiments, LateBinding mechanism allows SME 108 to design service model 501 to define values for attributes 608a-f at the service model execution (i.e. dynamically) based on available data at that time. LateBinding dynamic values may include the date and time value at the time of execution or available attribute values at the execution time such as prior response attribute values from the NE. The LateBinding mechanism may also be set with Regular Expressions and if-then-else logic. For example, if a PortId supplied by the operator 106 is already used, LateBinding may bind a port to port number returned by GETCONFIG target element plus 1. The LateBinding mechanism may be executed by vTransactor 112 prior to calling the Target Type protocol specific connector to compute the values based on previously captured data known by vTransactor 112. SME 108 may also design service model 501 to collect the value from the target device and use the value to compute the new value using the LateBinding mechanism at the Target Type protocol specific connector.

As described herein, TEs represent underlying VS Os. For NETCONF based TargetTypes, VSOs are generated by loading the published YANG schema. For REST based TargetTypes, VSOs can be built by loading the published JSon or XML payloads. For SOAP based TargetTypes, namespaces and container hierarchy of attributes 608 can be added using service model builder user interface 500. For CLI based TargetTypes, commands or set of commands can be added using service model builder user interface 500. A VSO represents the request message that would go to a target device. The target device is an instance of the TargetType. The system would build the request message to the target device on the basis of the TargetType specific VSO in the sequence of the service components 506a-f that the target elements are directed to for a specific step within the service model 501.

Figure 7A:
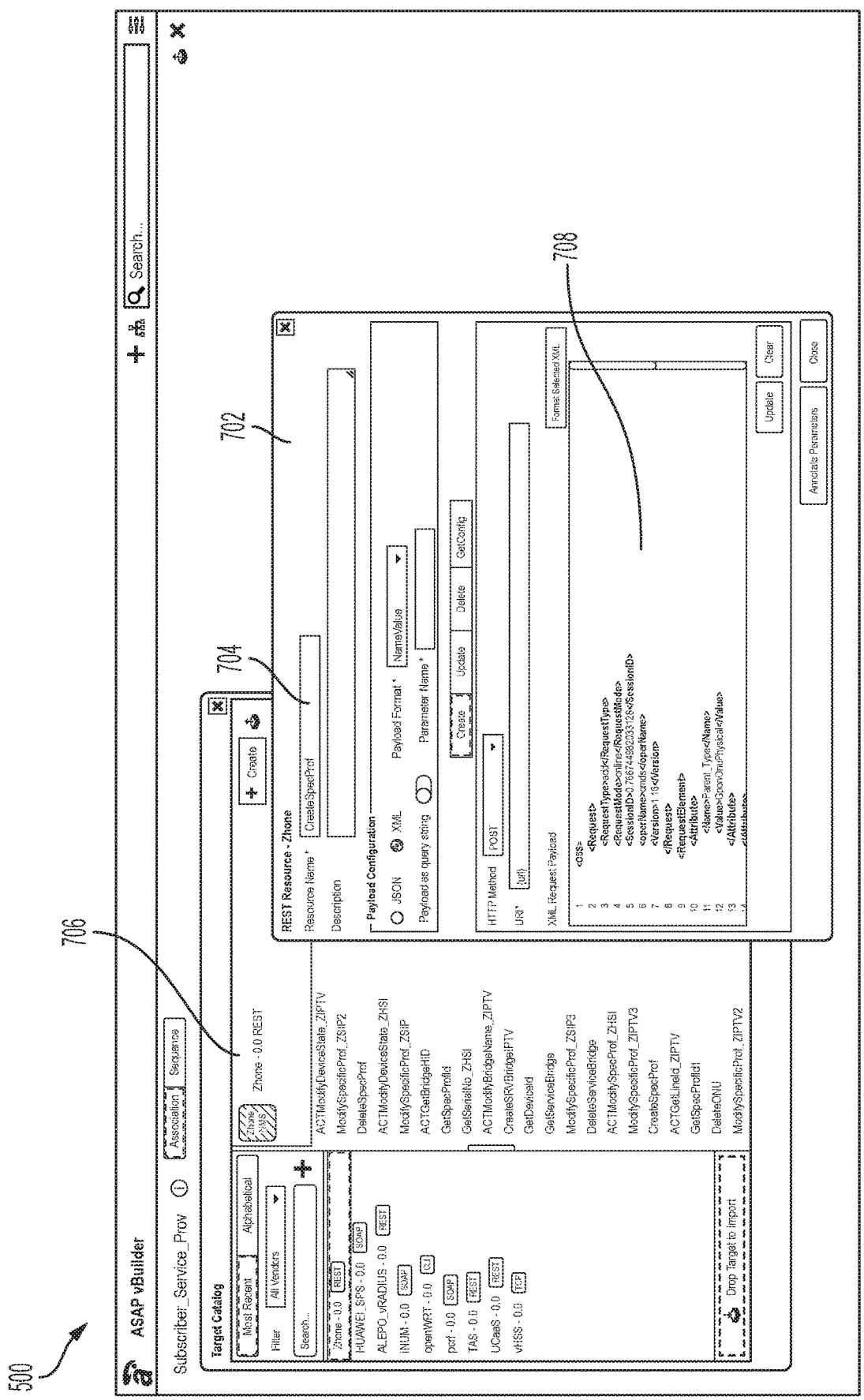
FIG. 7A is a screenshot showing a service model builder user interface including a vendor schema object display window and a service component display window directed to a target element using representational state transfer (REST) architecture, according to some embodiments of the present disclosure.

FIG. 7A shows an exemplary display of a VSO using REST protocol within service model 501. A VSO display window 702 is shown for a REST based TargetType for a CreateSpecProfile 704 of a Zhone_HSI_SC service component 706. The VSO display window 702 provides the schema 708 for each facet including CREATE, DELETE, UPDATE, GET, or any custom facet. Each facet corresponds to an operation like CREATE, DELETE, UPDATE, GET. For example, schema 708 of FIG. 7A corresponds with the CREATE facet schema for the CreateSpecProfile of the Zhone_HSI_SC service component 706.

Figure 7B:
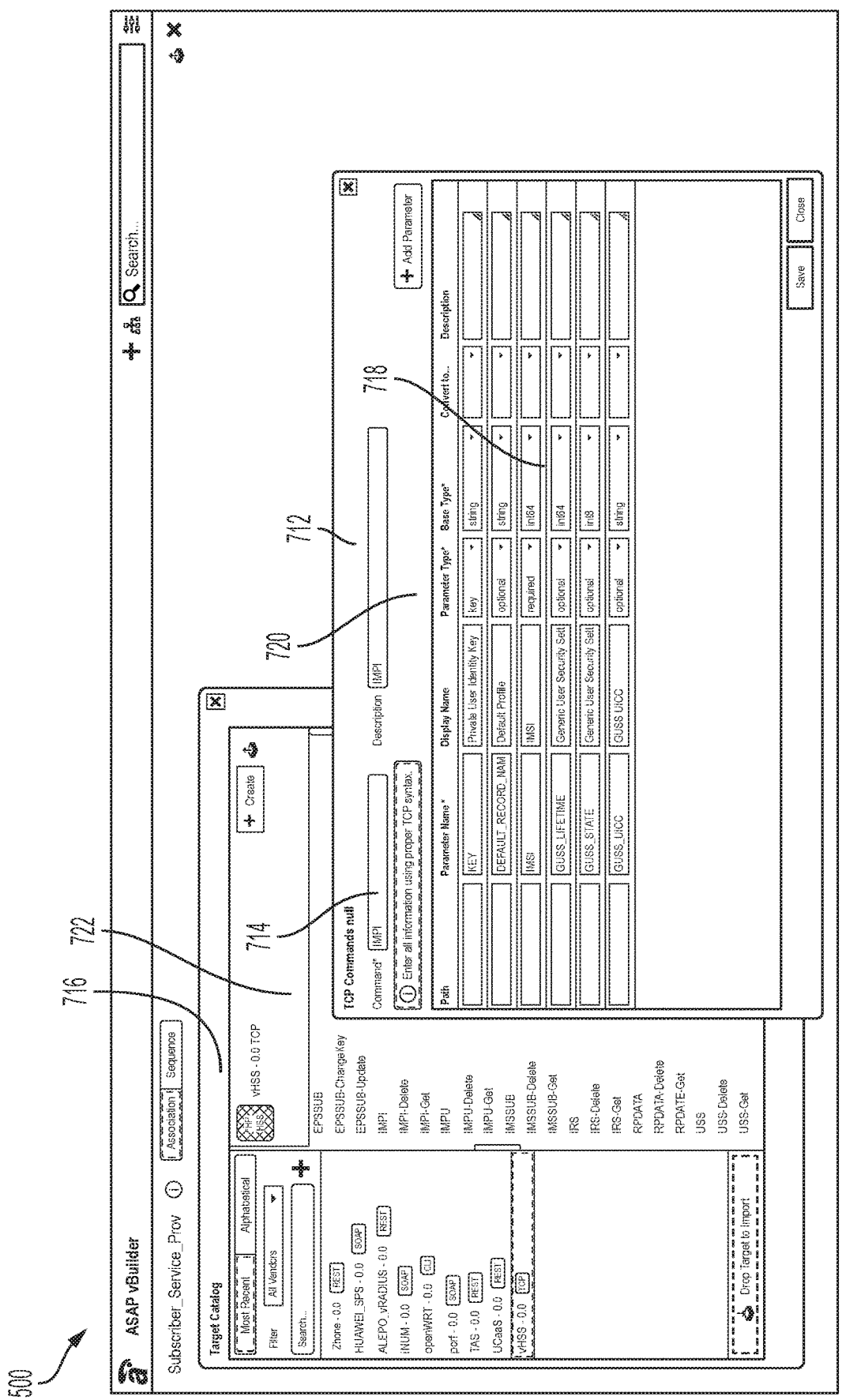
FIG. 7B is a screenshot showing a service model builder user interface including a vendor schema object display window and a service component display window directed to a target element using Transmission Control Protocol (TCP) architecture, according to some embodiments of the present disclosure

FIG. 7B shows an exemplary display of a VSO using TCP/CLI syntax within service model 501. A VSO display window 712 is shown for a TCP based TargetType for a IMPI record 714 of a virtual HSS (vHSS) 716 that includes a Target Catalog window 722. The VSO display window 712 provides a schema 718 describing the attributes (or parameters) such as KEY, DEFAULT_RECORD_NAME, IMSI, GUSS_LIFETIME, GUSS_STATE, GUSS_UICC. For example, schema 718 of FIG. 7B describes each attribute with name, display name, parameter type, base data type, request data type, etc. The entire vendor schema object represented in FIG. 7B is for one IMPI record. VSO display window 712 also includes a parameter type input 720 indicating whether the attribute is optional, required, or a key attribute associated with IMPI 714. From a Target Catalog window 722, SME 108 is able to generate one or more TEs corresponding to the VSO display windows 702 and 712.

Once service model 501 is built using service model builder user interface 500, SME 108 may export completed service model 501 from vBuilder 110 and send it to operator 106 for execution in an E2E network. The operator 106 will import the service model 501 into vTransactor 112 and then execute or run service model 501 in one of the two ways. One such way is to execute service model 501 using a transactor GUI. A second way is to use transactor Nortbound API (NB-API) through OSS/BSS systems. In both cases, the operator 106 provides the needed attributes, defined using the service model builder user interface 500, for rolling out a service instance 410. In some embodiments, transactor Northbound NB-API provides an API getServiceData( ) to give the details of the needed attributes for service model 501. When operator 106 executes service model 501 by providing the attributes, service model 501 will be executed in two steps. In the first step, all attributes, other than LateBinding attributes, are resolved with formulas and coalescing annotations and the service instance 410, as described in connection with FIGS. 4A-4C, is created. In the second step, created service instance 410 is applied to the target devices (also referred to herein as a "rollover," and described further in connection with FIG. 8B). In case of NB-API, both steps are executed with a single API call from OSS/BSS. The transactor GUI is further explained in connection with FIGS. 8A and 8B, where FIG. 8A represents the first step and FIG. 8B represents the second step.

Figure 8A:
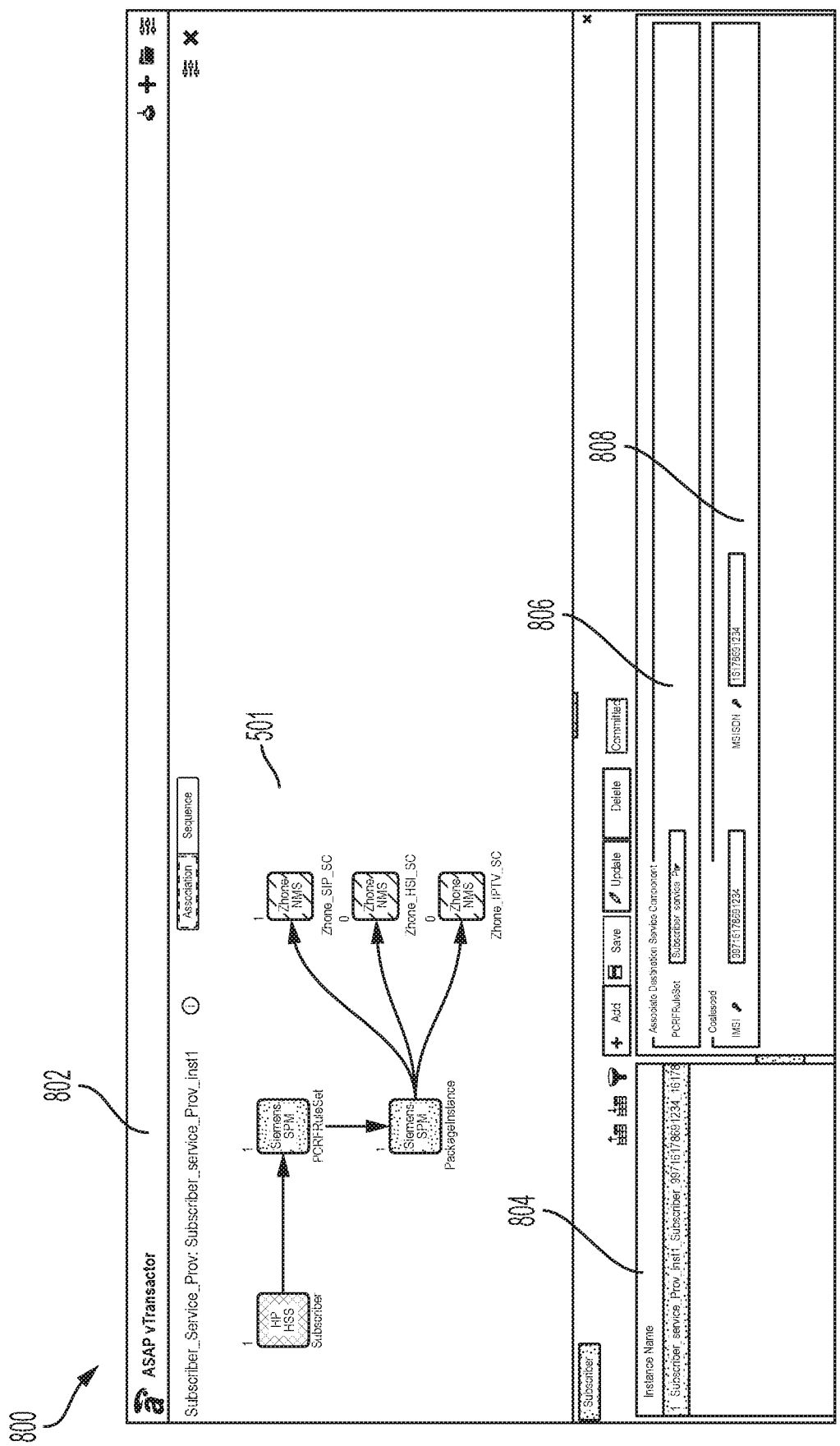
FIG. 8A is a diagram of a service model transactor user interface used to execute a service model, according to some embodiments of the present disclosure.

FIG. 8A is a screenshot showing a service model execution with transactor GUI by providing attributes for each service component. The system will build the service instance corresponding to the inputs, as described herein. FIG. 8A shows a service model transactor page 800, a service model title 802, a service instance 804, a current service component instances 806, and an attributes page 808. Service model transactor page 800 may be part of the operator-labeled system suite that includes service model builder user interface 500, such as the ASAP system. For example, in FIG. 8A, attribute page 808 for Subscriber provisioning, IMSI and MSISDN are the required attributes. By clicking the service component Subscriber (service component 506a of service model 501), the necessary attributes for this Subscriber service component are displayed in the attribute page 808. The attributes displayed here are at the service component level, as shown in connection with FIG. 5B. The operator 106, may build the service instance for one of service service components 506a-f, or all service-components or combination of needed service components of the service model 501. The result or output of this process is the creation of the service instance, as described above.

Figure 8B:
FIG. 8B is a screenshot showing a service model transactor user interface footprint management including rollover and dry-run, according to some embodiments of the present disclosure.

FIG. 8B is a screenshot showing a service model transactor user interface footprint management including rollover and dry-run, according to some embodiments of the present disclosure. FIG. 8B shows the rollover of a service instance 820, represented by the title Subscriber_Service_Prov_Inst1, facilitated using service model transactor page 800 as described above. Service instance 820 may be rolled over to multiple TargetTypes and multiple target devices (or target instances) within a TargetType. Operator 106 may choose to give the specific target list or leave it to the auto-routing algorithm to determine the target list. In FIG. 8B, 4 different target devices are selected for service instance rollover, including a HSS target 822, a PCRF target 824, an iNUM target 826, and a Zhone NMS target 828. In some embodiments, TargetType-wise VSOs are sent to the corresponding Target Type protocol specific connector in sequence to build the final request messages and sent to the target devices. Any LateBinding attributes are resolved prior to building the request messages.

Operator 106 can stop sending the rollover data (resolved service instance data) to a target device if the device is not operational. As shown in FIG. 5C, service model 501 may contain TAS TargetTypes that may not included as a part of rollover of the service instance 1 830 shown in FIG. 8B. vTransactor 112 footprint target devices may be defined by operator 106 such that the footprint is not applied to the TAS TargetTypes. Instead of giving the list of target devices for each transaction, vTtransactor 112 provides the facility for operator 106 to auto route the footprint based on input data ranges, as further described herein. For example, if the MSISDN is in certain range of numbers, it will auto-route to a set of VNFs in a market, and for a different MSISDN range it would route to a different set of VNFs in a different market. As such, operator 106 may be able to push the service instance to a full set of target devices or a subset of target devices.

Service model 501 is executed by service model transactor 112 in ordered steps as set by SME 108, described herein with respect to FIG. 5C. Service model 501 may include a different sequence as determined by SME 108 in service model builder 110. Each step of rollout corresponds to an annotated TE, which is based on a VSO. The rollout operation such as CREATE, DELETE determines the facet. As explained above, a facet includes all necessary verb syntax for every target element input by SME 108 into the service model 501. SME 108 may assign attributes 608 to corresponding facets of VSOs using service model builder 110 as described herein. For example, using CRUD semantics, a first attribute may only include create and update commands, a second attribute may only include create, delete, and get commands, and a third attribute may only include create and update commands such that it is not necessary that each attribute include all four CRUD semantic operations to be present within a given attribute. In some embodiments, LateBinding attributes may need to be resolved based on the other attributes from prior responses and formulae.

After all the VSO attributes are resolved, a target-specific request message 956 is built and sent to the device on the specified transport.

Figure 9A:
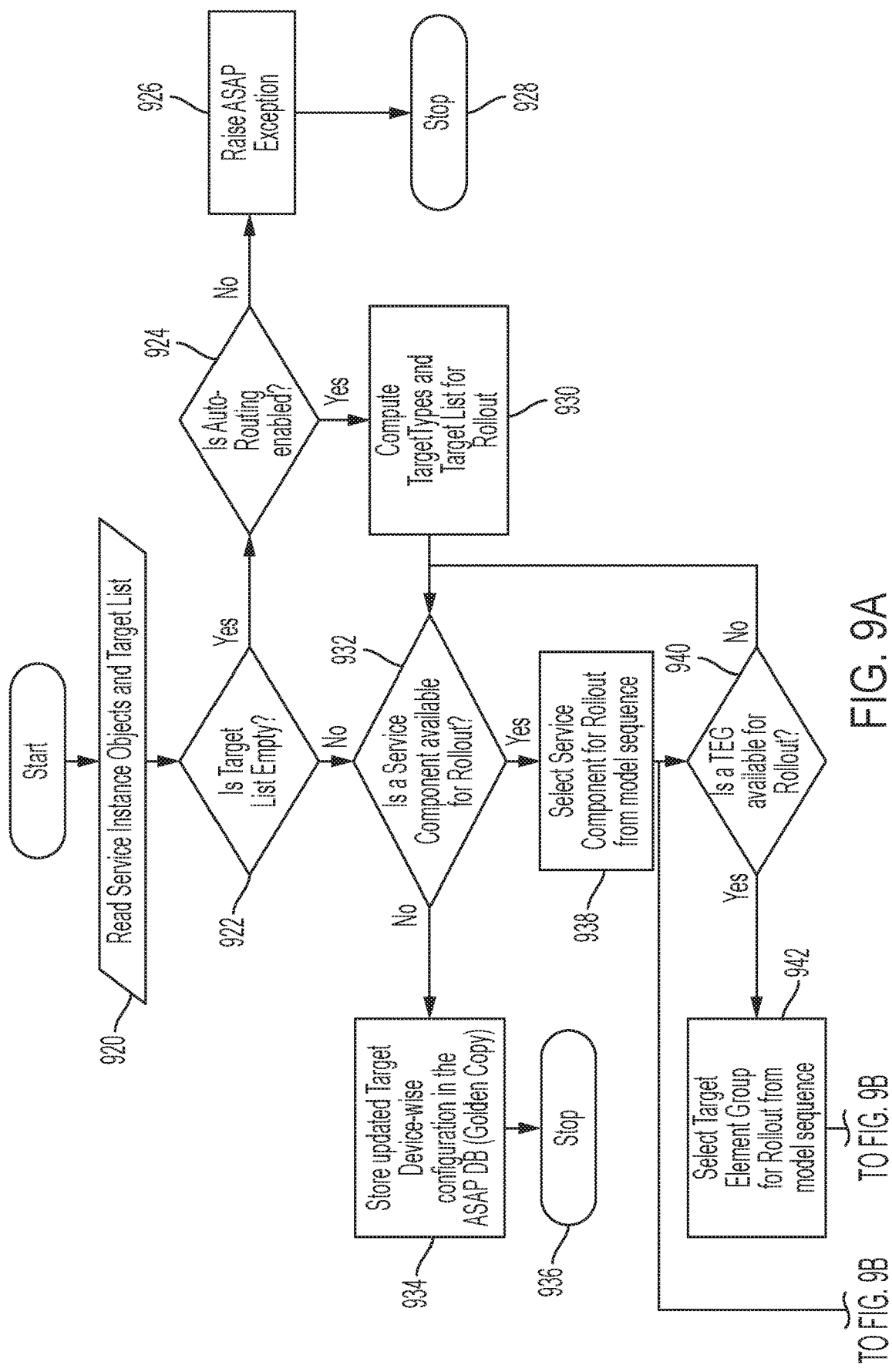
FIGS. 9A-9B are a flow diagram of the steps in a service module rollout executing a service among network elements, according to some embodiments of the present disclosure.
Figure 9B:
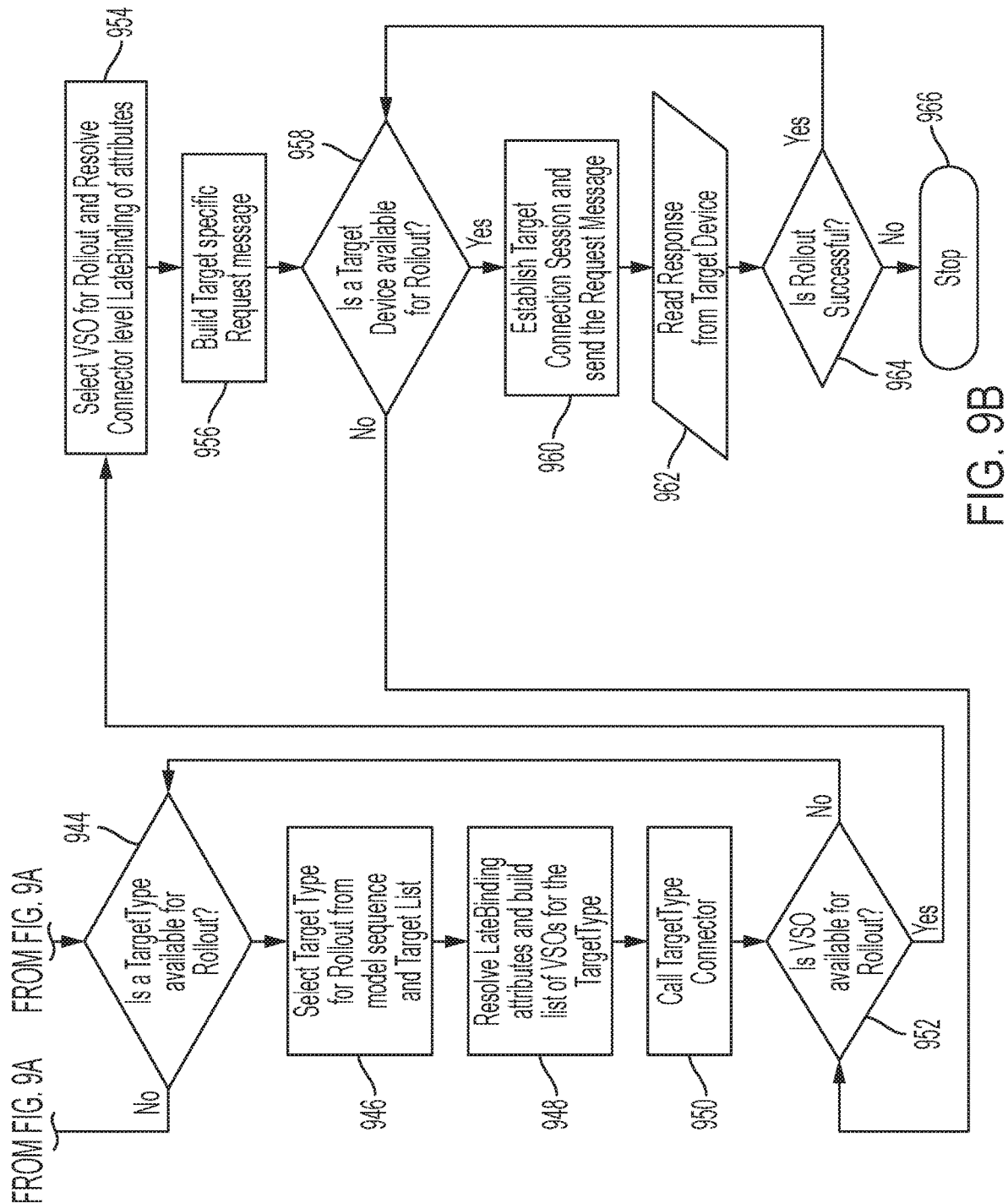

FIGS. 9A-9B are a flow diagram illustrating an embodiment of a service model rollout that includes a sequence of systematic steps directed to individual target devices. SME 108 may control the rollout by placing target elements, represented by icons, in a predetermined order for each service component and ordered from left to right to indicate the proper sequence, as shown in FIG. 5C. Service model transactor 112 executes the service model 501 received from service model builder 110. Each step includes service component attributes consisting of at least one of the network element facets required by the service. Service model rollout systematically applies each step to VSOs as defined in the service model 501 by SME 108 until all steps of the service model 501 are complete.

For example, rollout is directed to provisioning a subscriber in the distributed network. Rollout is carried out by vTransactor 112 and applied to VSOs as defined in the service model 501 as directed to TEs. As described herein, service model execution is defined in two steps. First step is the service instance creation after resolving the given attributes to VSOs. The second step is the rollout that pushes the configuration to the footprint by taking the service instance as the input. At step 920, vTransactor 112 reads the service instance objects and target list for the rollout. The operator 106 supplies the service component attributes, and optionally the target list, as part of the transaction, such that the remaining process is automated in accordance with the service model 501. The service instance is calculated based on the attributes for the service model 501 and this is the starting point for the rollover. At step 922, vTransactor 112 checks whether operator 106 supplied the target list or not. vTransactor 112 then determines if auto-routing is enabled at step 924 if the target list is empty at step 922 in order to determine whether the rollout may continue. In some embodiments, the target list is computed using an auto-routing algorithm based on pre-determined routing rules. vTransactor 112 captures the routing rules for the installation and applies those routing rules for computing the automated target list. Auto-routing rules may include giving a service dependent rules for service component attributes such as MSISDN or IMSI. Auto-routing may be executed using a numeric range or specific values. If auto-routing is not enabled, at step 926, vTransactor 112 raises an exception, in the form of an error message or other notification form and ceases the rollout represented at step 928. If auto-routing is enabled, at step 924, vTransactor 112 computes TargetTypes and Target List for rollout, at step 930, as described herein with respect to the service model 501. Such Target Lists for a service model 501 rollout are computed by pre-defined rules. For example, if a rule for service model 501 with MSISDN range1 is TargetList1 and for MSISDN range2 is TargetList2, auto-routing algorithm determines the range for the given input attributes and then computes the corresponding TargetList. If the TargetList is empty, there is no footprint to rollout and the service model will stop.

After determining the non-empty Target List vTransactor 112 vTransactor 112 may put the service components that need the rollout in the order set by SME 108 using service model builder user interface 500. vTransactor 112 chooses the first available service component in the sequence for rollout. If a service component is not available for rollout at step 932, vTransactor 112 interprets that to mean the rollout is completed. In response to rollout completion, vTransactor 112 stores the target-wise rollout, which is the target-wise list of VSOs, in the service database 310 of FIG. 3, at step 934. The target-wise list of VSOs in the service database may be referred to as a "golden copy." This golden copy reflects the actual data on the target device for a service data. The golden copy may provide operator 106 a restorative data point of the E2E network in case of rollout failure. For building the golden copy of the existing services on the target devices, a "sync-from" function is available. Once a target device configuration is updated at the service database 310, the rollout stops at step 936.

At step 932, if the routing engine included in vTransactor 112 determines that the specific service component is available for rollout, vTransactor 112 selects the service component for rollout in accordance with the service model rollout sequence as set by SME 108 in step 938. Recognition may be made possible by the routing engine within vTransactor 112 having such capabilities, as described herein. Following selection of a service component in accordance with the sequence, vTransactor 112 may check whether the TEG corresponding with that service component is available to execute rollout, at step 940. If the TEG is not available for rollout, vTransactor 112 reverts back to step 932 to rollout the next available service component in the sequence. After selecting the specific TEG, at step 942, vTransactor 112 selects the available TargetType from the sequence of TargetTypes for the TEG, at step 944. If the TargetType is not available, vTransactor 112 reverts back to step 940 to find the next available TEG within the service component for rollout.

At step 946, if the TargetType within the selected TEG is available for rollout, vTransactor 112 selects the TargetType for rollout. At step 948, vTransactor 112 resolves LateBinding attributes and builds a list of VSOs for the TargetType. Throughout the service model execution, vTransactor 112 maintains a context cache. The context cache may contain prior response objects such that they be made available. As used herein, a cache can be any memory storage device and is not limited to specific cache types described in memory hierarchy. The formulas associated with the LateBinding attributes are evaluated with available data from the TargetType. There may be LateBinding attributes that depend on responses within TEG objects and those attributes are evaluated further at the Target Type protocol specific connector level. The LateBinding attributes collected may then be retained by vTransactor 112, as further described herein. Thereafter, at step 950, vTransactor 112 calls upon the Target Type protocol specific connector contained therein for proffering the rollout. VSOs for rollout are arranged in the sequence given in service model. If, at step 952, the VSO is not available for rollout, vTransactor 112 reverts to step 944 for checking the next available TargetType for rollout. If the VSO is available at step 952, vTransactor 112 selects the VSO for rollout and resolves the LateBinding attributes, if any, at the Target Type protocol specific connector with the VSO at step 954.

At step 956, vTransactor 112 builds a target element-specific request message. This message will be pushed to the target device. Step 958 checks for target devices for rollout. If it is a test run (dryRun=true), the built request message is kept in the context cache in dryRun section. If it is not a test run, it will select the available target device for rollout. If the target device is not available or if it is a dry-run, vTransactor 112 reverts to step 952, such that vTransactor 112 checks for the next available VSO in the sequence as defined by SME 108. If the target device is available at step 958, vTransactor 112 will establish a target connection session and send the request message, built at step 956, to the target device, represented by step 960. Following receipt of the request message, the target device responds to vTransactor 112 with a response message, which is read by vTransactor 112 at step 962. Based on the target device response, vTransactor 112 determines if the rollout was executed successfully at step 964. If the target device response indicates success of the rollout at step 964, vTransactor 112 returns to step 958 to query the next target device in the sequence defined by SME 108 as part of the service model. If rollout is not successful at step 964, vTransactor 112 proceeds to step 966 whereby vTransactor 112 stops the rollout operation. As part of stopping the rollout operation, vTransactor 112 may provide a notification to operator 106 indicating a rollout failure. In some embodiments, prior to stopping the rollout operation, vTransactor 112 may trigger additional service components defined by service model, as described with respect to FIGS. 10A-10B.

In the event that vTransactor 112 does not complete rollout (e.g., a service model rollout failure/anomaly is detected), the service model triggers a service model rollback (also referred to herein as a "rollback") that reverses the order of the service model rollout and reverts each service model step to its pre-service model execution state. In some embodiments, the system described herein executes rollback as the reverse of the service model rollout (also called a "default rollback" herein). In other embodiments, vTransactor 112 performs the steps of the service model rollout in a reverse order such that vTransactor 112 performs the opposite of each service model step supplemented by additional steps as defined by the service model (also called a "custom rollback" herein). Using service model builder 110, SME 108 may define rollout and rollback operations within each step (target element) triggered by a service model anomaly. In some embodiments, SME 108 may define multiple attributes within a rollback step that were not part of the corresponding service model rollout step (e.g., DELETE operation of a rollout could be single step operation but may include get/create/update steps to restore target element to pre-service state in rollback.) SME 108 will build the rollout steps and rollback steps in the service model 501 in right sequence. In some embodiments, some of the steps in the service model 501 are exclusively applicable for rollout and some of the steps are exclusively applicable for rollback. In some embodiments, exclusivity is controlled by setting the operation at Target Element level as 'NO OPERATION' for either rollout or rollback.

Figure 10A:
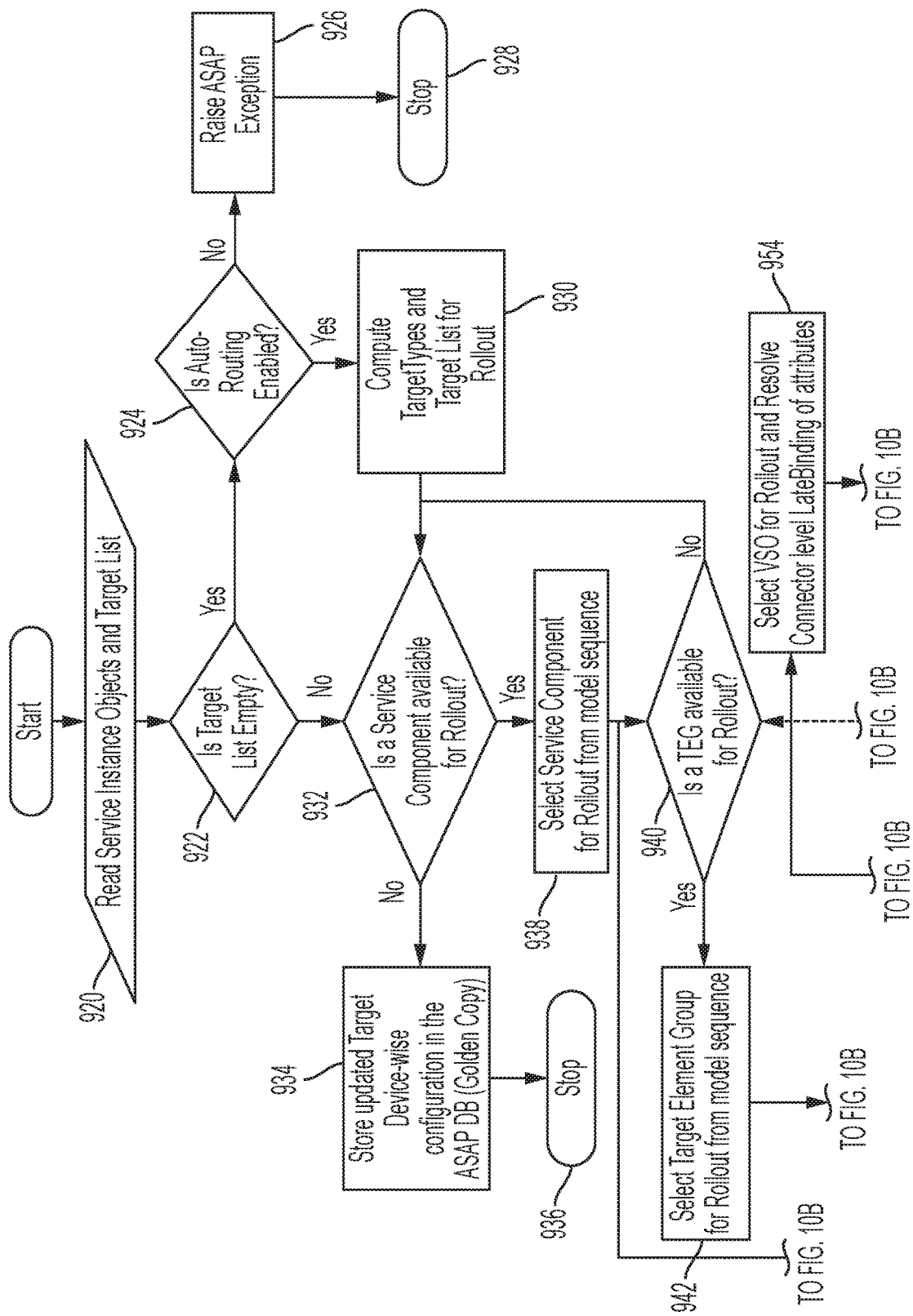
FIGS. 10A-10B is a flow diagram of the steps in a service module rollback executing a default rollback procedure, according to some embodiments of the present disclosure.
Figure 10B:
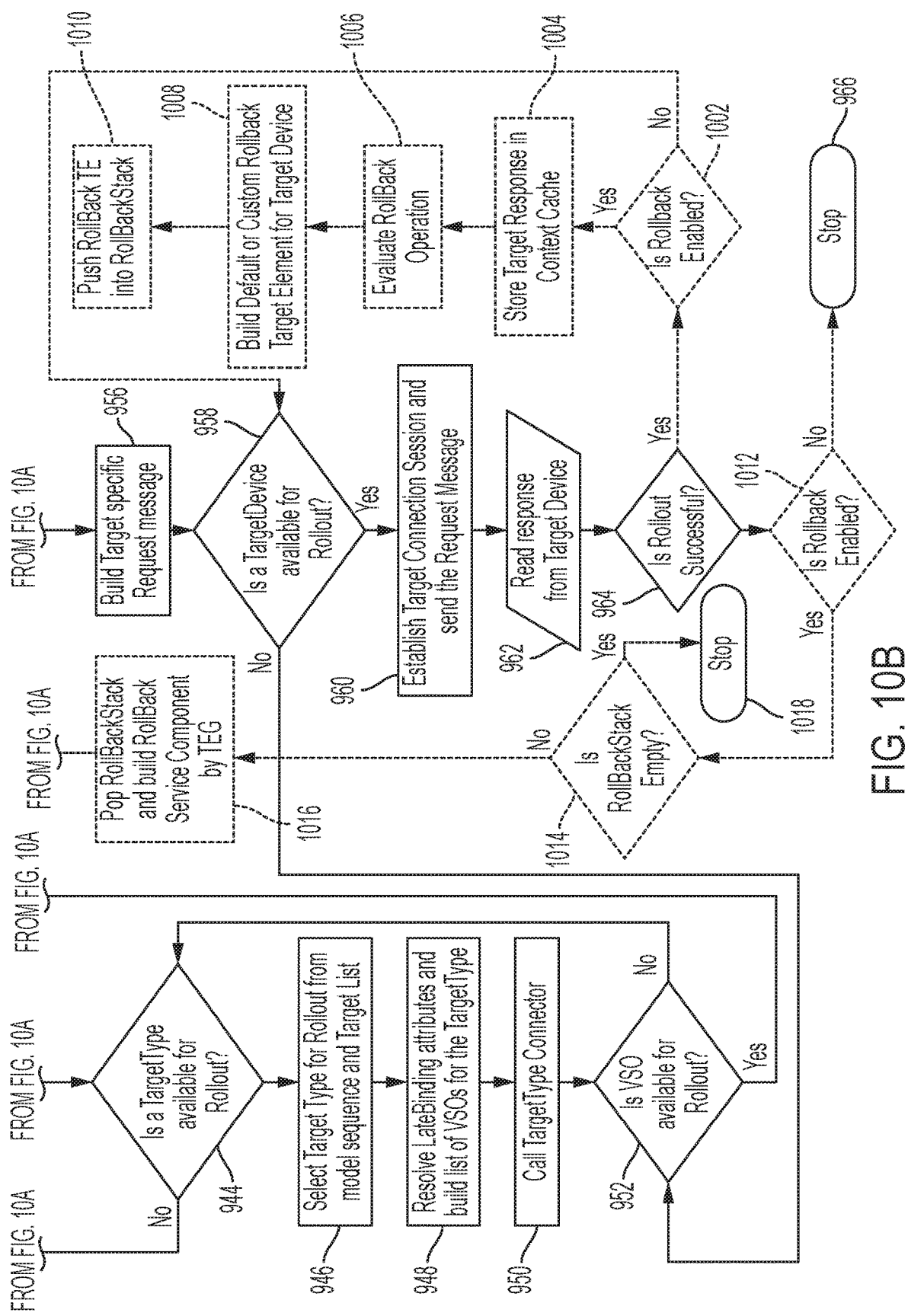

FIGS. 10A-10B are a flow diagram illustrating an embodiment of a service model rollback of the service model rollout in FIGS. 9A-9B, in one embodiment of the present disclosure. In reversing rollout procedure, service model transactor 112 performs the steps of the service model rollout in the reverse order. Service model transactor 112 retains the order of the service model rollout by interpreting the service model provided by service model builder 110. Additionally, service model transactor 112 performs the opposite of each service model step executed as part of rollout in order to revoke the operation in rollout and return the network elements to their pre-service status.

For example, rollback is directed to a failed service instance of a subscriber provisioning in the distributed network. The process for rollout is repeated in FIGS. 10A-10B, corresponding to step 920 through step 964 shown in FIGS. 9A-9B. At step 964, vTransactor 112 checks whether rollout is successful. If rollout is successful at step 964, vTransactor 112 queries whether rollback is enabled by inspecting the service model constructed by SME 108. If rollback is not enabled at step 1002, vTransactor 112 will proceed to step 958 for the next target device in the service instance, as set by the operator 106. If rollback is enabled at step 1002, vTransactor 112 will store the target device response from step 962 in a context cache at step 1004. Then, at step 1006, vTransactor 112 will evaluate the rollback operation as defined within the service model by SME 108. To evaluate the rollback operation, vTransactor 112 will consider the operation of the target element for rollout and rollback, such as CREATE operation for rollout and DELETE operation for rollback, etc. At step 1006, it will evaluate whether the rollback operation is the default rollback operation or the custom rollback operation. If the Target Element (TE) corresponding to the current VSO is not defined within the rollout and rollback operations, vTransactor 112 will consider the steps as default rollback operation. If the rollout and rollback operations are defined at TE, it is considered as a custom rollback operation. Based upon the rollback operation defined in step 1006, vTransactor 112 will build a rollback Target Element either with default rollback or a custom rollback, later described in connection with FIGS. 11 and 12 respectively, at step 1008. At step 1010, vTransactor 112 will then push a rollback target element object into a rollback stack. The rollback stack may be stored in a cache, memory, or other data storage repository associated with vTransactor 112. The rollback target element is based on the underlying VSO with the facet corresponding to the rollback operation for a specific target device. When rollback is called, it is capable of building a request message to the target device for rollback. In some embodiments, step 1010 allows for a number of rollback target element commands to be pushed into the rollback stack in a single rollout transaction. Pushing of multiple target element commands within a single rollback stack from vTransactor 112 improves network efficiency. After step 1010, the rollout process continues by returning to step 958.

If rollout is not successful at step 964, vTransactor 112 queries whether rollback is enabled within the service model being executed. At step 1012, if rollback is not enabled, vTransactor 112 stops the rollout operation ending at step 966. As part of stopping the rollout operation, vTransactor 112 may provide a notification to operator 106 indicating a rollout failure. If instead, at step 1012, rollback is enabled, vTransactor 112 queries whether a rollback stack is empty at step 1014. If the rollback stack is empty, vTransactor 112 stops the operation, represented by step 1016. If step 1014 finds the rollback stack is populated, vTransactor 112 executes step 1016 whereby the rollback stack is populated by vTransactor 112 using the rollback operation evaluated at step 1006 and built at step 1008 and vTransactor 112 builds a rollback service component. The rollback service component may be built based on the rollback stack. The rollback service component will support TargetType specific connection sessions similar to rollout with groups of messages. After building the rollback service component at step 1016, vTransactor 112 proceeds to step 940 in rollout to carryout the service instance with the rollback enabled.

In some embodiments, the evaluation of the rollback operation may determine that the rollback operation is a default service rollback operation (also referred to herein as "default rollback"). The default service model rollback is limited to CREATE, UPDATE and DELETE rollout operations. If the service model is handling any custom operation like CONFIGSYNC, IMSISWAP, default rollback may require further operation functionality by SME 108. Further functionality may be embodied in a custom service model rollback (also referred to herein as "custom rollback") for any execution failures. The custom service model rollback allows SME 108 to input additional facets into the rollback stack such that rollback is more than an inverse of rollout. In some embodiments, the default rollback performs the opposite facet within each corresponding step (e.g., rollout create corresponds to a rollback delete, rollout update corresponds to a rollback update, rollout delete corresponds to a rollback create, and rollout get operations corresponds to a rollback no operation).

Figure 11:
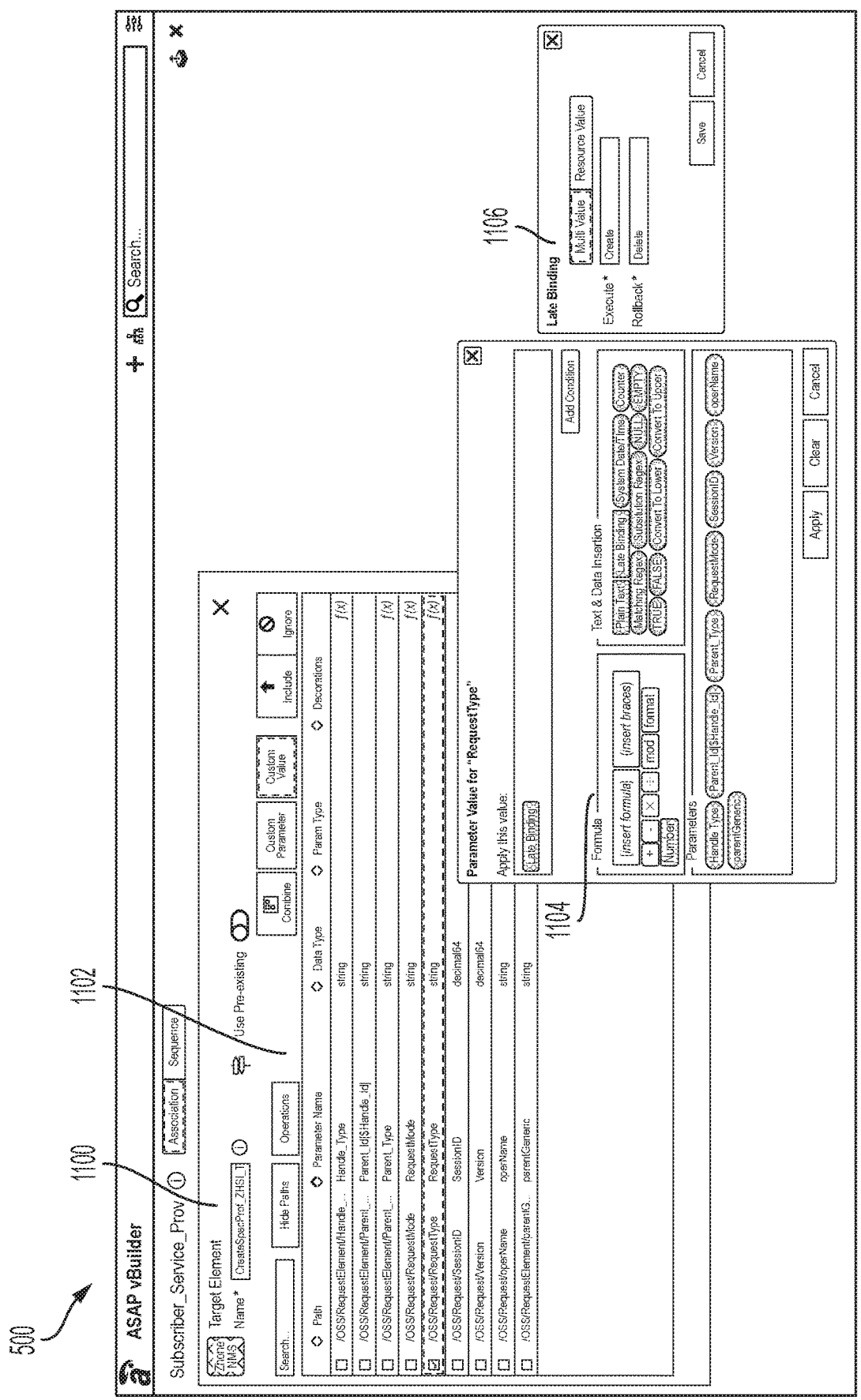
FIG. 11 is a screenshot showing a service model builder user interface with a target element parameter view for assigning multiple conditional values for an attribute based on a context, according to some embodiments of the present disclosure.

When rollback is enabled, for working with default service model rollback mechanism, a default rollback VSO facet may be defined by SME 108 as part of the service model to be available as part of the rollback. If there is no default rollback VSO facet, it is considered as no operation for rollback corresponding with that specific step in the sequence. FIG. 11 is a screenshot showing a service model builder user interface with a target element parameter view for assigning multiple conditional values for an attribute based on a context, according to some embodiments of the present disclosure. FIG. 11 shows a similar target element window 1100 to that depicted above in FIG. 6, designed for formulating default rollback attributes. The target element window 1100 provides a corresponding attributes section 1102. For example, target element window 1100 corresponds to a Target Element CreateSpecProf in Zone_HSI_SC service component. The attributes section 1102 allows selection of a single TE of the Vendor Schema Object (VSO) of the Zone_HSI_SC for all facets. In such a case, even though multiple facets may be at VSO, a single TE may serve multiple operations for the default rollback. SME 108 may choose to annotate each of individual attributes using a formula 1104. User interface 1106 shows the details of decorating with the formula 1104, to include, for example, a LateBinding value. The LateBinding value allows for the selected attribute to contain multiple values that correspond with the rollout steps and the rollback steps, respectively. For the default rollback operation, there may be a single annotated TE serving rollout and rollback mechanisms. In some embodiments, there may be certain parameters that need one value during rollout and different value during rollback. For example, as shown in FIG. 11, attribute RequestType should be annotated with value "Create" for rollout and value "Delete" for rollback. The attribute can be set dynamically at runtime based on the operation using LateBinding, as discussed in connection with FIG. 11, in LateBinding window 1106. In Formula window 1104, the "LateBinding" capsule may be used as the value for the 'RequestType' attribute. When "LateBinding" capsule is clicked, it will open LateBinding window 1106, which will have two tabs. Select 'MultiValue' tab allows the values to be defined for Rollout (Execute) and Rollback. During execution, the utilized value will be set depending on the operation and VSO will be built with that value for sending to the target device.

For example, for Target Element CreateSpecProf in Zone_HSI_SC service component, the corresponding VSO CreateSpecProf shall have both Create facet and Delete facet. The same TE will support both CREATE operation for rollout and DELETE operation for rollback. However, certain attributes may have one value for rollout and different value for rollback. For example, in CreateSpecProf VSO, RequestType attribute should have the value 'add' during CREATE operation and the same attribute should have the value 'delete' during DELETE operation. In some embodiments, the Target Element attributes supports multi-value logic depending on rollout as compared to rollback. In service model builder 110, SME 108 may set the multi-value logic for an attribute, as described herein.

In another example, an operator may be attempting to upgrade a user package, including a combination of different services (e.g., Internet, phone, and television services) on a Ribbon UCaaS device. Other network elements for rollout and rollback functionality may include Zhone, Video Surveillance as a Service ("VSaaS"), Packet Data Network Gateway ("PGW"), Serving Gateway ("SGW"), Policy and Charging Rules Function ("PCRF"), Home Subscriber Server ("HSS"), iNum, and Telecom Application Server ("TAS"). In order to do so, the operator or an SME, may capture the rollback operation stack in the service model deployed by embodiments of the system (e.g. an order for the update), indicating specific operations at each of the CRUD semantics for REST resources. Within that service model operation, the SME may create a target element for the order that captures the CRUD rollout operations and the corresponding rollback operations, as described above. In this non-limiting example, the service model may include three distinct steps to update the subscriber's information including creating a new package under orders, updating subscriber with the new package identification information, and removing the old packages that were associated with the subscriber. As part of the rollout, after creating the new order based on the specified CRUD semantic operations, the system may push the updated subscriber information to the Ribbon UCaaS element, which include the steps of creating the new subscriber information field such as an order stockkeeping unit ("sku") or quantity, updating any existing subscriber information fields such as the product details, deleting existing product information, and a get function to retrieve additional information from a database. In addition, the system may also push the rollback stack as part of the order, including commands inverse to those of the rollout (e.g., before sending "Create new package under Orders" command to the Ribbon UCaaS, the rollback stack will include a rollback command to "remove newly created package under orders"; for the "update subscriber with new package id" rollout command, the system may push the rollback command "update subscribers with the old package id" into the stack) For some commands included as part of the rollout stack, the rollback stack may not have a corresponding rollback command (e.g., for "remove old package which was associated with subscriber" is the last to command rollout, so a rollback command is not necessary and the system will not update the rollback stack before rollout). In the final step of the rollout, the system may attempt to remove the old package that was associated with the subscriber. If however, that removal fails due to lack of connection or improper sequencing, the populated rollback stack of the service model order will trigger the rollback and pop the rollback stack commands to complete the process at the network, such as the Ribbon UCaaS in this example. By doing so, the system may ensure that the UCaaS subscriber's old package and services are active, even though the new package deployment may have failed.

Figure 12:
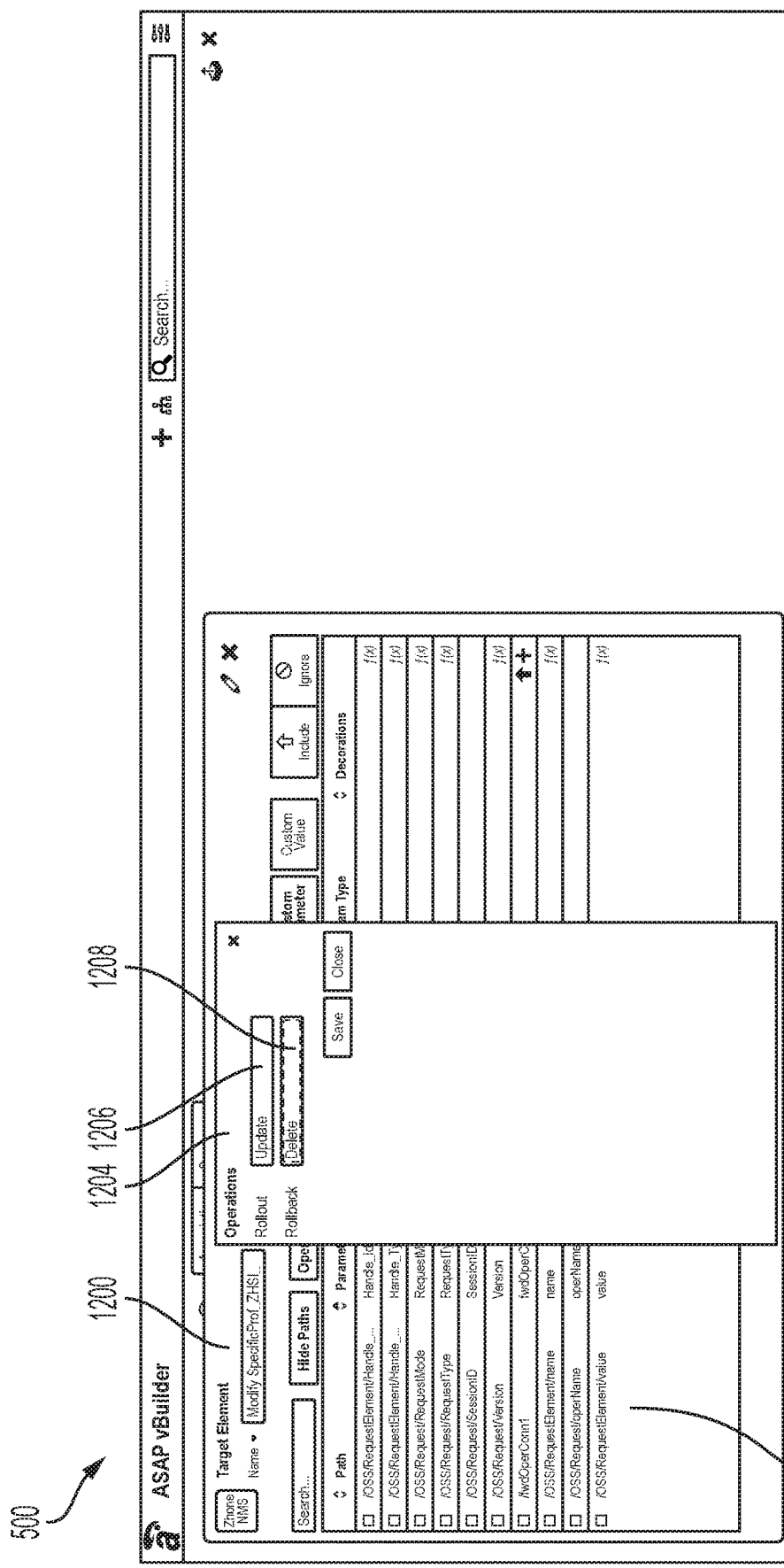
FIG. 12 is a screenshot showing a service model builder user interface with a target element parameter view defining a custom rollout and rollback operations, according to some embodiments of the present disclosure.

In some embodiments, custom rollback mechanism may be included at the Target Element level. FIG. 12 is a screenshot showing a service model builder user interface with a target element parameter view defining a custom rollout and rollback operations, according to some embodiments of the present disclosure. As shown in FIG. 12, custom rollback is enabled by defining the TE operations as 'Update' for rollout and 'Delete' for rollback. Using this mechanism, any custom facet can be defined at VSO level and it can be used for rollout or rollback at the corresponding TE. FIG. 12 shows a target element window 1200 that provides a corresponding attributes section 1202. For example, target element window 1200 corresponds to a Target Element ModifySpecificProf in Zone_NMS service component. The attributes section 1202 displays each single TE of the Vendor Schema Object (VSO) of the Zone_NMS. To build the custom rollback capability SME 108 may choose to annotate an operation using an operation formula window 1204. Operation formula window 1204 shows the details of decorating the TE with specific rollout facet 1206 that differ from a corresponding rollback facet 1208 associated with the TE. For example, in FIG. 12, rollout facet 1206 includes an Update facet, whereas rollback facet 1208 is a Delete facet. Using operation definition window 1204 SME 108 may define the custom rollback operations that are not simply inverse operations of one another for the specific VSO. (e.g., Update is not the inverse or opposite operation of Delete.) In doing so, SME 108 may define custom rollback to include additional steps that would not be part of either default rollback nor the rollout. However, it is understood that inverse operations may be included as part of the rollback operation. The operation formula window 1204 allows SME 108 to define rollout and rollback facets 1206 and 1208 for each attribute in rollout using the VSO associated with the TE. The sequence of operations for the custom rollback correspond to the reverse order of the target element sequence, and attributes therewith, defined using service model builder user interface 500.

When multiple facets are defined at the VSO level, one corresponding TE may be used for all operations. In such a case, default rollback may be evaluated by vTransactor 112 to determine the sequence of operations to be carried out as part of the default rollback. In other embodiments, if custom annotation is needed for an operation or custom rollback is needed, multiple TEs can be created at service model builder user interface 500 for supporting multiple operations or multiple VSO facets within the service model. For custom rollback, TE operations need to be defined as described in FIG. 12 above. For a default rollback, there may be one TE for all operations (i.e. CREATE, UPDATE, DELETE, GET), but there will be an individual TE for each operation for custom rollback (e.g., CREATE_TE for CREATE, Delete_TE for DELETE, etc.).

In some embodiments, the rollback may include a pre-condition and a post-condition in each step. In some embodiments, the pre-condition may consist of disabling the service instance operation on the service component prior to executing the service model step directed to target elements of the service component. In other embodiments, the pre-condition includes a get operation that retains the pre-service data in the context cache prior to implementing the service model step. In some embodiments, the post-condition may consist of enabling the service instance operation on the service component following the execution of the service model step directed to target elements of the service component. In other embodiments, the executed service model step may include a modify condition that includes the pre-condition, service model attributes, and post-condition. All these additional steps may be modeled as Target Elements in the service model that can be executed only in rollback operation and they will be annotated with "NO OPERATION" for rollback that have no affect during rollout.

In some embodiments, the rollback may include a step, presented as a null step within rollout, that accounts for specification of relationships between objects (e.g., parent/child or hierarchical relationships between service components). As described herein with respect to FIG. 5A, SME 108 may define relationships between service components based upon how service components are related while creating a service model 501 in service model builder 110. SME 108 may include, using service model builder 110, a null rollout step with the service model such that, during rollback, service model transactor 112 performs the rollback operation on children objects before the rollback of parent objects.

In the event that service model transactor 112 does not complete the service model rollback, the successful rollout steps and the rollback steps are captured in a logger (also referred to herein as "log file"). The logger, contained within vTransactor 112, may capture the recovery of service component target elements. In some embodiments, the operator 106 may execute the request messages recorded in the logger manually to perform the rollback that otherwise failed due to service anomalies. The logger ensures that rollback commands are recorded in case operator 106 elects to use the manual rollback execution. In some embodiments, the operator 106 may execute the config-sync using the golden copy in order to push the golden copy to the target device.

In other embodiments, service model builder 110 is capable of performing model-based, data driven provisioning of existing data in service components. In this way, service model builder 110 allows operator 106 to capture a complete image of the E2E system data, creating a master version (i.e. a "golden copy") of each network element's data for data integrity of a service in the system. The golden copy network service model executes data collection across all devices at the inception of network integration and stores that E2E network configuration in the appropriate service orchestrator service data format. As many VNFs are long-lived and multi-tenant, retention of a master version of the network data structure allows for sufficient data integrity in event of failure and efficiency in adding devices to the network. A model can be created from at least one of a priori knowledge of protocols or device related to service instantiation, and from protocol and device type detected by the service model.

In some embodiments, service model builder 100 enables SME 108 to create a golden copy service model that executes using the same attributes and facets designed for a service model rollout and rollback. In this way, the golden copy service model executes as a type of sync service model to parse target elements of the target object using network element schema or native protocol and store the received data into a service orchestrator service data format. For example, when onboarding a new MVNO owned by a carrier, the golden copy service model can be deployed within the MVNO and obtain a file that analyzes and links the data from each target object appropriately for a service orchestrator.

The retained golden copy of the network device data may be retained by a service orchestrator to establish a base-line network structure or, in the event of catastrophic network failure, restore the network back to its original state. Alternatively, the golden copy of the network device data provides a baseline for comparison with current data status. Doing so allows operator 106 or service orchestrator to push appropriate data to target objects for efficient end to end network operation.

While certain embodiments of the present disclosure have described data automation techniques with respect to telecommunication applications, the systems and methods described herein are also applicable to other applications that use agent-less targets. As described herein, agent-less targets are usually targets that need to be constantly configured. Unlike agent-based targets where update information can be pulled from a server, the updates associated with an agent-less target require either more frequent and/or more application specific updates that are not practicable to pull from a server. An example of an agent-less application is factory automation. Robotic parts in a factory may require incremental configuration (e.g., robotic parts in an assembly line).

In some embodiments, systems and methods are disclosed for performing an agentless, data-driven and stateful automation for provisioning of services to mobile network customers. In some embodiments, the systems and methods comprise receiving, at a computing device, a first object parameter associated with an object, the first object parameter including at least one of a device type and a protocol. In some embodiments, the systems and methods include retrieving, at the computing device, based on the first object parameter a second object parameter from: a database associated with the computing device, when configuration parameters associated with the protocol comprise an importable form, the importable form being associated with data that is importable from a server into the database, and user inputted data when the configuration parameters associated with the protocol comprise a non-importable form, the non-importable form being associated with data that is not importable from a server into the database. For example, data in an importable form may include generic configuration parameters or code required to communicate with a target device based on protocol semantics or metadata fields. Non-importable data may include customer specific information, such as billing information, account number, QoS terms, that may be input by an operator for individual customers. In some embodiments, the second object parameter includes the data configuration parameters associated with the second object parameter. In some embodiments, the systems and methods described herein include receiving, at the computing device, an organization parameter associated with creating at least one sub-recipe, each of the at least one sub-recipes comprising at least one of: the target object, one or more other target objects, and an association between the target objects. In some embodiments, the systems and methods described herein include processing, at the computing device, a recipe, the recipe including at least one sub-recipe for transmission to an execution engine to a service instance, the service instance comprising pre-filled configuration parameters based on the recipe, the service instance being customizable by operator 106 for a specific network device, thereby of performing an agentless, data-driven and stateful automation for provisioning of services to mobile network customers.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computer-implemented method for rolling back model-based provisioned network device configurations comprising:
    receiving data associated with a request to transmit a target object request message to a target device selected from a list of target device types, the request to transmit the target object request message including a sequence of request messages for a plurality of target devices defined by a data template sequence of a model-based provisioned data template;
    transmitting the target object request message to the target device, the target object request message including configuration parameters specifying create, read, update, and delete (CRUD) semantic operations; and
    based on determining that the target object request message was executed unsuccessfully, performing a rollback stack to ensure data integrity by:
        retrieving a rollback stack associated with the target object request message, the rollback stack specifying the CRUD semantic operations associated with the configuration parameters,
        retrieving pre-configuration data of a target object response message; and
        requesting the target device execute the rollback stack based on the pre- configuration data to restore the target device to a pre-request state.

2. The computer-implemented method of claim 1, wherein the target object request message defines capabilities of the target device and the capabilities are stored in a data repository associated with the target device.

3. The computer-implemented method of claim 1, further comprising:
    transmitting a retrieval message to the target device; and
    receiving the target object response message from the target device in response to the retrieval message, wherein the target object response message comprises pre-configuration data of the target device.

4. The computer-implemented method of claim 3, further comprising storing the pre-configuration data of the target object response message in a cache associated with a model-based provisioned data template, wherein the pre-configuration data of the target object response message is retrieved from the cache.

5. The computer-implemented method of claim 4, wherein the plurality of target devices defined by the model-based provisioned data template includes a sequence of target device types defined by an operator including at least one of Unified Communications as a Service (UCaaS), Zhone, Video Surveillance as a Service (VSaaS), Packet Data Network Gateway (PGW), Serving Gateway (SGW), Policy and Charging Rules Function (PCRF), Home Subscriber Server (HSS), iNum, and Telecom Application Server (TAS).

6. The computer-implemented method of claim 1, wherein the CRUD semantic operations comprise:
    a first object parameter associated with a target device type,
    a target device type protocol, and
    user-provided data.

7. The computer-implemented method of claim 1, further comprising:
    receiving a notification from the target device indicating an outcome of execution of the target object request message; and
    determining that the target object request message was executed unsuccessfully based on the notification from the target device.

8. The computer-implemented method of claim 1, further comprising:
    receiving additional data associated with an additional request to transmit an additional target object request message to the target device;
    transmitting the additional target object request message to the target device, the additional target object request message comprising configuration parameters specifying the CRUD semantic operations; and
    based on determining that the target object request message was executed successfully, transmitting the additional target object request message to a second target device from the list of target device types.

9. The computer-implemented method of claim 1, wherein the request that the target device execute the rollback stack includes executing the rollback stack in a reverse order of a rollout stack as an inverse operation of the configuration parameters in the target object request message.

10. The computer-implemented method of claim 1, further comprising transmit a notification indicating unsuccessful execution of the target object request message after restoring the target device to the pre-request state.

11. The computer-implemented method of claim 1, wherein the configuration parameters include an importable form, the importable form being associated with data that is importable from a server into a database.

12. A system comprising:
    at least one processor; and
    a non-transitory computer memory comprising instructions that, when executed by the at least one processor, cause the system to perform operations of:
        receiving data associated with a request to transmit a target object request message to a target device selected from a list of target device types, the request to transmit the target object request message including a sequence of request messages for a plurality of target devices defined by a data template sequence of a model-based provisioned data template;

transmitting the target object request message to the target device, the target object request message including configuration parameters specifying create, read, update, and delete (CRUD) semantic operations; and based on determining that the target object request message was executed unsuccessfully, performing a rollback stack to ensure data integrity by:

retrieving a rollback stack associated with the target object request message, the rollback stack specifying CRUD semantic operations associated with the configuration parameters, retrieving pre-configuration data of a target object response message; and requesting the target device execute the rollback stack based on the pre-configuration data to restore the target device to a pre-request state.

13. The system of claim 12, wherein:

the request that the target device execute the rollback stack includes executing the rollback stack in a reverse order of a rollout stack as an inverse operation of the configuration parameters in the target object request message; and the inverse operation has a plurality of parameter types, each of the plurality of parameter types including an operator-defined function that defines additional parameter fields beyond those in the target object request message.

14. The system of claim 12, wherein transmitting the target object request message comprises a target-device specific operation capable of preserving the pre-configuration data associated with the target device.

15. The system of claim 12, wherein receiving the data associated with the request to transmit the target object request message further includes determining whether auto-routing of a target device type is enabled within a model-based provisioned data template.

16. A non-transitory computer-readable storage medium comprising instructions that, when executed by at least one processor, cause a computer device to device perform operations of:

receiving data associated with a request to transmit a target object request message to a target device selected from a list of target device types, the request to transmit the target object request message including a sequence of request messages for a plurality of target devices defined by a data template sequence of a model-based provisioned data template;

transmitting the target object request message to the target device, the target object request message including configuration parameters specifying create, read, update, and delete (CRUD) semantic operations; and based on determining that the target object request message was executed unsuccessfully, performing a rollback stack to ensure data integrity by:

retrieving a rollback stack associated with the target object request message, the rollback stack specifying CRUD semantic operations associated with the configuration parameters, retrieving pre-configuration data of a target object response message; and requesting the target device execute the rollback stack based on the pre-configuration data to restore the target device to a pre-request state.

17. The non-transitory computer-readable storage medium of claim 16, wherein:

the request that the target device execute the rollback stack includes executing the rollback stack as an operator-defined function according to an order specified by an operator-defined operation; and the operator-defined operation includes a plurality of formula parameter types customized at a time of operation.

18. The non-transitory computer-readable storage medium of claim 16, wherein a target device type protocol of the CRUD semantic operations comprises at least one of representation state transfer (REST) protocol, structured query language (SQL) protocol, simple object access protocol (SOAP), secure files transfer protocol/secure shell protocol (SFTP/SSH), simple network management protocol (SNMP), and network and configuration protocol (NETCONF).

19. The non-transitory computer-readable storage medium of claim 16, wherein a first object parameter of the CRUD semantic operations further includes a plurality of vendor schema objects in a list associated with a target device type.

\* \* \* \* \*